(12) United States Patent
Mochimaru et al.

(10) Patent No.: US 7,236,948 B1
(45) Date of Patent: Jun. 26, 2007

(54) FOOT SHAPE INFORMATION DISTRIBUTING NETWORK SYSTEM

(75) Inventors: Masaaki Mochimaru, Tokyo (JP); Makiko Kouchi, Tokyo (JP); Kozo Kimura, Minoo (JP); Tsuneaki Utsumi, Minoo (JP)

(73) Assignees: National Institute of Advanced Industrial Science and Technology, Tokyo (JP); I-Ware Laboratory Co., Ltd., Osaka (JP)

( * ) Notice: Subject to any disclaimer, the term of this patent is extended or adjusted under 35 U.S.C. 154(b) by 466 days.

(21) Appl. No.: 10/416,723

(22) PCT Filed: Nov. 15, 2000

(86) PCT No.: PCT/JP00/08056

§ 371 (c)(1),
(2), (4) Date: Oct. 14, 2003

(87) PCT Pub. No.: WO02/40941

PCT Pub. Date: May 23, 2002

(51) Int. Cl.
*G06Q 30/00* (2006.01)
*G06F 17/30* (2006.01)
(52) U.S. Cl. .............................. 705/26; 705/27; 705/1
(58) Field of Classification Search ................ 705/26, 705/27, 1; 36/12, 93, 97
See application file for complete search history.

(56) References Cited

U.S. PATENT DOCUMENTS 6,438,868 B1 * 8/2002 Fini ............................... 36/12

2002/0004763 A1 * 1/2002 Lam ............................ 705/26
2002/0120531 A1 * 8/2002 Fonsen ........................ 705/26

FOREIGN PATENT DOCUMENTS

| JP | 2720259 | 2/1978 |
|---|---|---|
| JP | 3-247305 | 11/1991 |
| JP | 10-240694 | 9/1998 |
| JP | 2000-90272 | 3/2000 |
| WO | WO 91/04686 | 4/1991 |
| WO | WO 91/17676 | 11/1991 |
| WO | WO97/00628 | * 1/1997 |

OTHER PUBLICATIONS

"Getting the Boot; Colorado's Le Ski Lab Has Moved Beyond the Hi-Tech Ski Boot Biz to Offer Custom-Fitted Insoles,," Wright, Hassell Bradley, Footwear News, p. 22, Jan. 24, 2000.*

* cited by examiner

*Primary Examiner*—Matthew S. Gart
(74) *Attorney, Agent, or Firm*—Koda & Androlia

(57) ABSTRACT

A foot shape information distributing system for distributing foot shape information including cross section data generated based on anatomical feature points of a foot. Eleven defined cross sections (A to K) are determined and stored. Server machine distributes foot shape information including the same cross section data and the same feature points as user terminal stores. Based upon the cross sections, shoes are selected or manufactured for a customer.

1 Claim, 25 Drawing Sheets

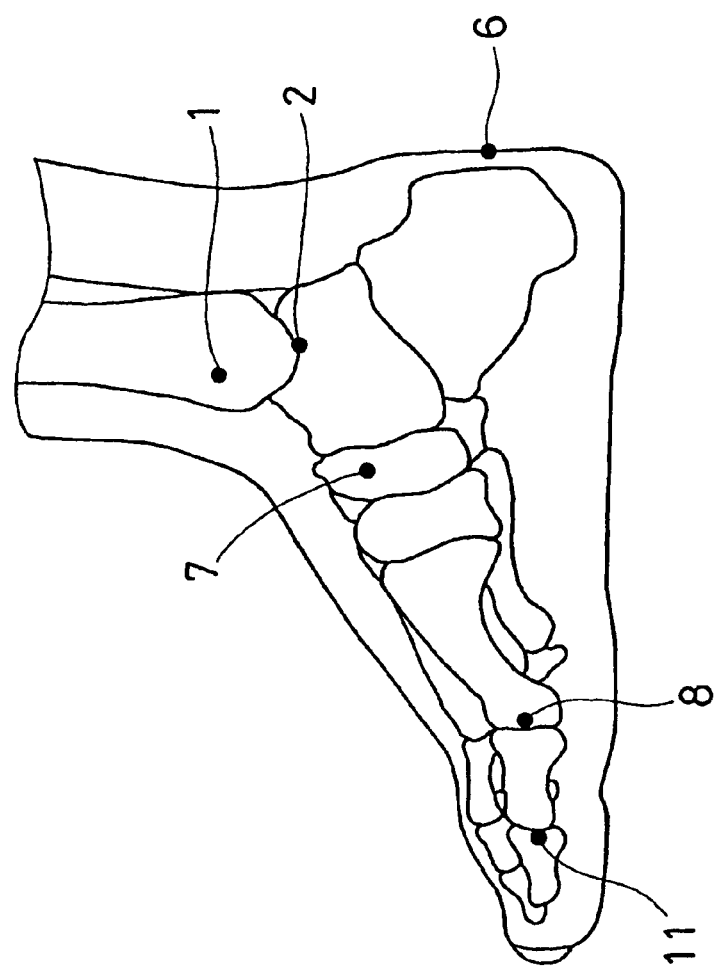

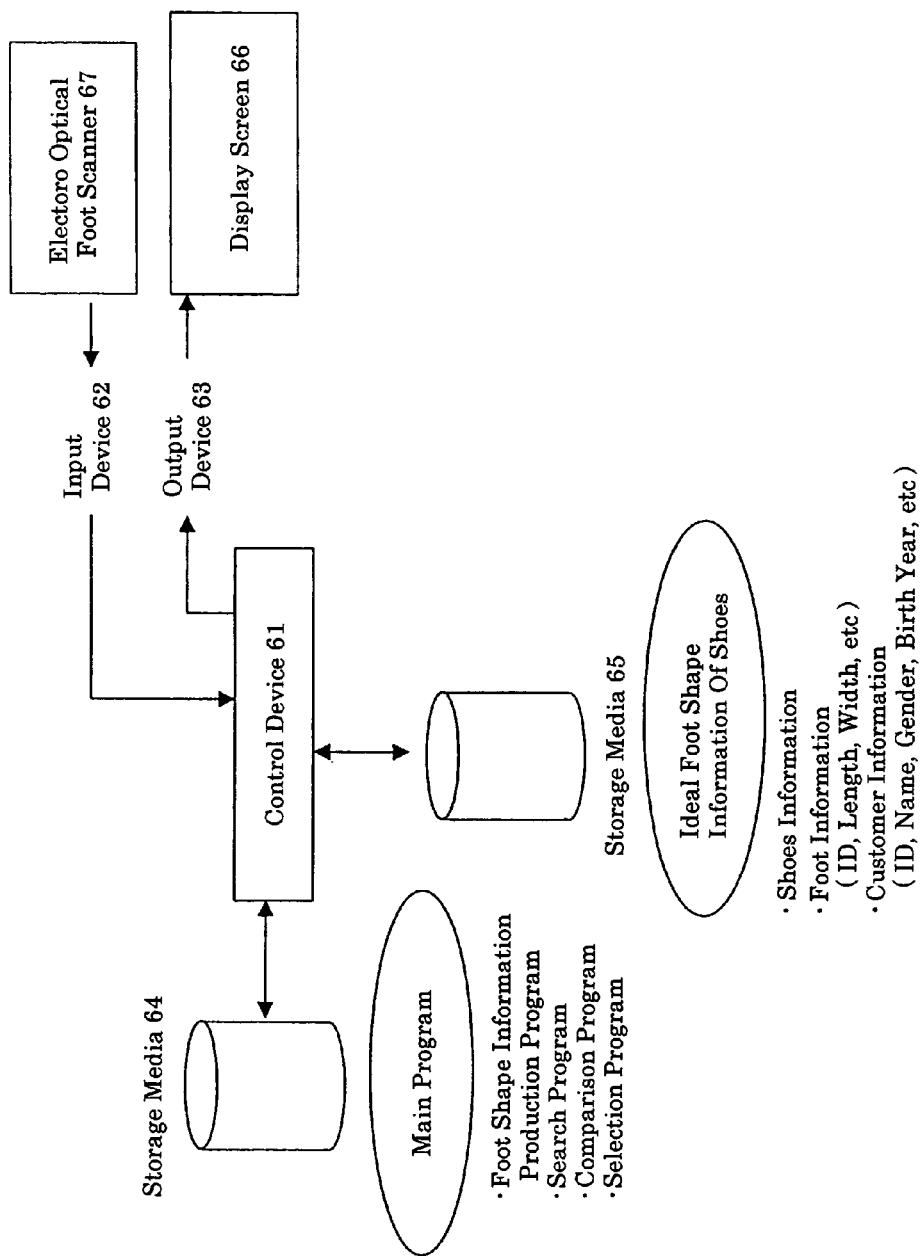

FOOT SHAPE INFORMATION DISTRIBUTING NETWORK SYSTEM

TECHNICAL FIELD

This invention relates to the definition of suitable foot measuring positions and the foot information network distribution system based on this definition.

TECHNICAL BACKGROUND AND PROBLEM (1) Until now, it has been common for people to try to select the well fitting shoe based on the foot size (length) and width. But the information on the size and width is not enough to select the well fitting shoe, because the individual feet have a variety of forms. Therefore, the new foot information format which represents foot shape feature has been desired instead of the foot size and width information.

(2) For the recent decades, the optical scanning system has been developed and used for three dimensional foot shape measurement. The scanned data is better in representing the complicated foot form than the traditional craftsmanship measurement data using the tape measure and the height gauge.

However, it has not been possible to identify which part of foot has to be compared as the correct position, or which position on the foot has to be the base point for the foot measurement in the case of comparison between or among the plural foot shapes. Thus, the quantitative comparison of three dimensional foot data has not been possible, even though the big/small judgment has been possible.

(3) And the data size of the scanned raw data is so large, that it makes network communication load heavy. Then the efficient and light data format has been desired to reduce the data size.

(4) There has been the FFD technique which is a technology to compare the three dimensional forms.

(T. W. Sederberg: Free Form Deformation of Solid Geometric Models, proceedings of ACM SINGGRAPH'86 in Computer & Graphics, 20–4, 151–160 (1986))

The following references relate to the FFD technique:
Japanese Patent Application Disclosure Hei10-240964 (Reference 1)
International Patent Application No. PCT/JP00/02297 (Reference 2)

When this FFD technique is used for deformation/comparison of plural three dimensional form data, each three dimensional form data has to have the corresponding landmarks. For example, if there are two three dimensional forms data, they must have the landmarks, such as the rearmost point of heel and the tip of great toe, which have the same anatomical meaning in every foot.

The FFD technique can quantify the difference between the two forms by deforming the landmarks of one foot to become those of the other form.

Until now, the FFD technique has not been applied for deformation/comparison of plural foot forms, because this technique can not be used for the three dimensional form data without landmarks, even if they were distributed.

(5) Over and above, there are some unsuitable cases to determine the landmark position on the surface of the scanned foot data without landmarks. It is difficult to determine the correct position of the anatomical landmark on the fleshy and smooth foot surface. It is also difficult to determine the landmark position only from the three dimensional foot surface data, because the differences in the three dimensional morphology in the fleshy and thin foot are large.

DISCLOSURE OF INVENTION

Way of Solving Problem and Effectiveness of Invention (1) Storage Media

This invention has the following features in order to solve the problem described above:
this invention is a computer accessible media in which three dimensional foot shape information is recorded and stored.
this foot shape information has "cross section data" which is defined based on the anatomical landmark points on the foot, and also has more than 4 cross section data, shown in the following (A)~(K) definitions.

"Foot shape information" in this invention means the information to specify the three dimensional foot form having "cross section data" described below.

And "cross section data" means the outline data of each cross section of (A)~(K) defined below:

(A): Horizontal cross section positioning at the 1.6 times of the mean of the sphyrion height (HT1) and the sphyrion fibulare height (HT2)

(Ba): Cross section passing through the following 3 points:
the point (B1) on the ankle surface just above the most prominent point 1 of medial malleolus at the average height of the height (HT5) of the cross section A and the height (HT3) of the most prominent point 1 of medial malleolus.
the dividing point (B2) near the anterior point A1 of the cross section A out of the 2 dividing points of the surface distance between the anterior point A1 of the cross section A and the junction point 5 into 3 equal length parts
the point (B3) on the ankle surface just above the most prominent point 3 of lateral malleolus at the average height of the height (HT5) of the cross section A and the height (HT4) of the most prominent point 3 of lateral malleolus.

(Bb): Cross section passing through the following 3 points:
the point (B1) on the ankle surface just above the most prominent point 1 of medial malleolus at the average height of the height (HT5) of the cross section A and the height (HT3) of the most prominent point 1 of medial malleolus.
the dividing point (B4) near the posterior point A2 of the cross section A out of the 2 dividing points of the surface distance between the posterior point A2 of the cross section A and the pternion 6 into 3 equal length parts
the point (B3) on the ankle surface just above the most prominent point 3 of lateral malleolus at the average height of the height (HT5) of the cross section A and the height (HT4) of the most prominent point 3 of lateral malleolus.

(Ca): Cross section passing through the following 3 points:
the most prominent point 1 of medial malleolus
the most prominent point 3 of lateral malleolus
the dividing point (C1) near the junction point 5 out of the 2 dividing points of the surface distance between the anterior point A1 of the cross section A and the junction point 5 into 3 equal length parts (Cb): Cross section passing through the following 3 points:
the most prominent point 1 of medial malleolus
the most prominent point 3 of lateral malleolus the dividing point (C2) near the pternion 6 out of the 2 dividing points of the surface distance between the posterior point A2 of the cross section A and the pternion 6 into 3 equal length parts (D): Cross section passing through the sphyrion 2, the sphyrion fibulare 4 and the pternion 6

(E): Cross section passing through the following 2 points and vertical to the sagittal plane including the foot axis CL:
  the nearest point (E1) of the 3 dividing points which come from the division of the surface distance between the junction point 5 and the tendon point (H3) of the cross section H into 4 equal length parts. The tendon point (H3) is the intersection point of the line (from the anterior tendon point 24 to the posterior tendon point 25) and the cross section H.
  the heel contact point 23

(F): Cross section passing through the following 3 points:
  the midpoint (F1) between the tendon point (H3) of the cross section H and the junction point 5
  the medial intersection point (F2) of the line passing through the foot axis junction point 27 at the right angle to the foot axis CL and the outline of the contact area of the sole 26.
  the lateral intersection point (F3) of the line passing through the foot axis junction point 27 at the right angle to the foot axis CL and the outline of the contact area of the sole 26

(G): Cross section passing through the following 2 points and vertical to the sagittal plane including the foot axis CL:
  5$^{th}$ metatarsal tuberosity point 9
  the nearest point (G1) of 3 dividing points which come from the division of the surface distance between the tendon point (H3) of the cross section H and the junction point 5 into 4 equal length parts.

(H): Vertical cross section passing through the following 2 point:
  the point (H1) near the navicular bone point 7 of the 2 dividing points which come from the division of the surface distance between the navicular bone point 7 and the metatarsal tibiale 8 into 3 equal length parts.
  the point (H2) near the 5th metatarsal tuberosity point 9 of the 2 dividing points which come from the division of the surface distance between the metatarsal fibulare 10 and the 5th metatarsal tuberosity point 9 into 3 equal length parts.

(I): Vertical cross section passing through the following 2 points:
  the point (I1) near the metatarsal tibiale 8 of the 2 dividing points which come from the division of the surface distance between the metatarsal tibiale 8 and the navicular bone point 7 into 3 equal length parts.
  the point (I2) near the metatarsal fibulare 10 of the 2 dividing points which come from the division of the surface distance between the metatarsal fibulare 10 and 5th metatarsal tuberosity 9 into 3 equal length parts.

(J): Vertical cross section passing through the metatarsal tibiale 8 and the metatarsal fibulare 10

(K): Vertical cross section passing through the contact point 11 of the great toe and the contact point 12 of the little toe By using the storage media that stores "foot shape information" which consists of "cross section data" defined as above, it becomes possible for a computer to compare and analyze the plural foot forms on the basis of the anatomical landmarks in the cross sections. And since more than 4 cross sections should be used in this invention, it is possible to get hold of main foot form information almost the same as that carried by the whole foot surface more effectively.

Because the cross section data mentioned above represent the most important characteristic parts of the three dimensional foot shape, they can effectively represent the foot form with small data size.

So far it has not been possible to determine the position of foot bones only from the surface foot form especially for heavy people.

However, this defined foot shape information can provide the useful information for the shoe manufacturing, because the positions of foot bones are described in each cross section data defined based on the anatomical landmarks.

The anatomical landmarks in this invention are shown in FIGS. 1a, 1b,1c, 1d.

The anatomical landmarks mean the points defined by the forms of the bones, the position of the tendon, etc. and the terms in the landmarks are synonymous with the terms used in the anatomy.

Other landmarks in this invention are defined below:
  Anterior tendon point 24: the intersection point of the tendon of the musculus extensor hallucis longus and the cross section L
  Posterior tendon point 25: the intersection point of the tendon of the musculus extensor hallucis longus and the vertical cross section of the midpoint of the foot length (size) at the right angle to the foot axis CL
  Junction point 5: the point at the junction of the leg and the foot and having the following two definitions:
    1) the intersection point of the tendon of the musculus tibialis anterior and the wrinkle of the ankle formed when the ankle is dorsiflexed
    2) the intersection point of the tendon of the musculus extensor hallucius longus and the wrinkle of the ankle formed when the ankle is dorsiflexed
  From the view of easier measurements and clearer junction point, the definition 1) is more desirable and this definition 1) is adopted in the way of the embodiment here.
  Heel contact point 23: the intersection point of the vertical cross section passing through the pternion 6 on the foot axis CL and the outline of the contact area of the sole 26
  Tendon point (H3) of the cross section H: the intersection point of the line between the anterior tendon point 24 and the posterior tendon point 25, and the cross section H.
  Center of ball point CB: the center of the maximum width line, which is projected to the floor, of the vertical cross section (cross section K) passing through the metatarsal tibiale 8 and the metatarsal fibulare 10.
  Foot axis CL: the projected line to the floor which passes through the heel contact point 23 and the center of ball point CB.
  Foot axis 2 SL: the projected line to the floor which passes through the pternion 6 and the 2nd metatarsal head point 15
  Posterior tendon parallel line BL: the parallel line to the foot axis CL, passing through the posterior tendon point 25.
  Outline of the contact area of the sole 26: the outline of the sole contacting the floor.
  Foot axis junction point 27: the intersection point of the foot axis CL and the foot bottom line which connects the medial (point 38) and lateral (point 39) bottom edges, on the outline of foot contact area of the sole 26, intersected by perpendicular traced line along the ankle surface from both sphyrion 2 for the medial side and sphyrion fibulare 4 for the lateral side.

It should be noted that the dividing points, which divide the distance between the two anatomical landmarks, are used in the cross section H and the cross section I. This dividing point can be obtained by either dividing the straight line distance or dividing the surface distance between the landmarks.

In the view point of specifying the foot surface forms, it is desirable to employ the way to divide the surface distance.

For example, in the case of the cross section H, the surface distance between the metatarsal tibiale 8 and the navicular bone point 7 is divided into 3 equal length parts.

(2) Network System

This invention relates to a network system which consists of user terminal 41 and server machine 42. The server machine 42 has the device to distribute to the user terminal 41 "foot shape information" including "cross section data" of the cross section shown in (A)~(K) and defined on the basis of the anatomical landmarks. The above foot shape information is characterized by having more than 4 "cross section data".

Through this network system, it will be possible to receive foot shape information in various places. That is, it is not needed to be the same place where the value of foot shape information is measured and the measurement value is analyzed and compared, and the opportunities to make use of foot shape information will be increased.

Accordingly it will become easier to make the selection and the manufacture of the best fit shoes.

"User" does not mean the person whose foot shape is measured but the person who requires foot shape information. Thus, the shoe-makers to manufacture the shoes or the scholars to study the foot forms on foot shape information fall under "user".

"User terminal 41" means the terminal used by user to get the information, and a computer which consists of display, control device, input/output devices (key board, mouse, etc.) and communication devices can be employed.

"Server machine 42" means the computer to distribute this foot shape information through network 43 and in case the network 43 is the Internet, the network 43 functions as the database server (and functions desirably as the web server too).

(3) Server Machine

This invention relates to a server machine 42 which is connected for ready communication by way of the network 43 and having the devices to distribute "foot shape information" including "cross section data" of the cross section shown in the above (A)~(K) and defined on the basis of the anatomical landmarks.

By this way, the invention related to the above network system can be embodied.

(4) This invention relates to the above server machine 42 and it is desirable for "foot shape information" distributed by the server machine 42 to have the cross section data of the ankle part, the malleoli part, the arch part, the ball part and the toe part. This cross section data can specify efficiently the three dimensional forms of the whole foot and this foot shape information makes it possible to manufacture the shoes well-fitted for the person who measures his/her feet.

(5) This invention also relates to the above server machine 42 and it is desirable for the server machine 42 to have the storage media that stores more than 2 numbers of "foot shape information data" against each foot size to distribute "foot shape information" in accordance with the foot size requirements.

By this way it will be possible to provide various foot shape information to the user upon his/her requirements and also be possible to meet various requirements of the user who receives foot shape information.

(6) This invention also relates to the above server machine 42 which is desired to have, "foot surface form data" in "foot shape information" distribution.

This "surface form data" does not mean the cross section data as explained earlier but mean various types of three dimensional form data which represent the foot surface forms. Exemplified are the set of the continuous coordinates to show the foot surface forms and the functional data for the curved surface to show the foot surface.

These surface form data have the merits to show visibly the foot feature points and the whole foot forms as well.

By processing this surface form data, the other cross section data of the foot than the ones described earlier can be obtained.

For example, the foot shape of the horizontal cross section at the height of 5 mm intervals from the foot sole can be obtained freely from this surface form data. Such newly defined cross section foot forms as the vertical cross section from the tip of the great toe to the pternion 6 also can be obtained by processing this surface form data.

The foot shape information in this invention has the cross section data based on the anatomical landmarks and the foot of any person can be compared on the basis of the anatomical landmarks. Furthermore, this foot shape information enables the user to visibly recognize the foot forms and to get a variety of foot forms (the cross section forms) by processing the surface form data.

In the shoe manufacturing, the dimension of circumference of each cross section is required. But the dimension of circumference of each cross section can not be correctly measured by just connecting the point to the point on the cross section since the measured dimension of cross section becomes always shorter than the actual dimension as the points on the cross section are connected by the straight line.

By way of this embodiment it is possible to both determine the position of the cross section based on the anatomical landmarks and get the dimension of the cross section circumference from the surface form data.

It should be noted that this surface form data, which shows the surface forms, includes the surface form data with suitably less number of the surface form data.

For example, of the foot forms, the part of complicated forms like the heel (near the Achilles tendon) has more number of the data and the part of simple forms like the in step and the sole has less number of the data.

Like this, by suitably thinning out the number of the data, the communication load will be reduced when the computer reading out the data or distributing the data through the network.

(7) This invention relates to the above network system and it is desired that "surface form data" in "above foot shape information" has the dimensional difference of 1.0 mm or less compared with the foot forms which actually measured.

As the accuracy of the measurement of the surface form data is increased, the utility-value of the information obtained by processing this data is also increased.

It is not possible to make the proper shoe manufacturing and repairing if the dimensional difference between the foot forms actually measured and the surface form data is too big. Especially, it is difficult to locate the part where the visual repairing is required.

Therefore, if the dimensional difference is 1.0 mm or less, which is considered to be within the allowable dimensional differences, the shoe manufacturing and repairing can be made as nearly as required by the customer.

(8) FFD Analysis

This invention can be embodied as the system to make the foot shape FFD analysis by the following way:

This is a network system which consists of the user terminal 41 and the server machine 42 having the FFD analysis method and User terminal 41:
stores "foot shape information" having the cross section data containing 5–200 points of the landmarks, and "cross section data" is the data of either of the above cross section (A)~(K) defined based on the anatomical landmarks.

Server machine 42:
has the device to distribute "foot shape information" having "cross section data" which correspond to the position of "cross section data" of "foot shape information" stored in the user terminal 41 and containing the landmarks defined as in the user terminal 41.

In this invention, the landmarks of the cross section pre-stored in the user terminal 41 and the landmarks of the cross section distributed from the server machine 42 have the same cross section and the same definition. Therefore, the user can make the foot shape FFD analysis by having the landmarks in foot shape information distributed from the server machine 42 through the network 43 correspond to the landmarks in foot shape information pre-stored in the user terminal 41.

By this way, it will be possible to make FFD analysis, even if the place of the foot measurement and the place of the FFD analysis are located remotely, by distributing various foot shape information to the user terminal 41 if the data communication by the network 43 is available.

A useful example is shown below:

The server machine 42 stores the ideal foot shape information on the standard shape for the shoe manufacturing of each shoe-maker. The user measures and stores foot shape information on a subject. The server machine 42 distributes through the network 43 the ideal foot shape information of each shoe-maker to the user terminal 41.

This foot shape information of each shoe-maker distributed by the server machine and foot shape information measured by the user have the same cross section data and landmarks.

Therefore, the user terminal 41 can make the FFD analysis by corresponding the landmarks. The user needs not to determine the landmarks by himself/herself by foot shape information received from the server machine.

By the FFD analysis of foot shape information of all the shoe-makers it will be possible to make judgment on which shoe-maker's foot shape information is best fit to the subject and also possible to be numeric and quantify the fittingness of each shoe-maker.

(9) This invention relates to the above network system and it is desirable that the landmarks in "foot shape information" stored in the user terminal 41 and distributed from the server machine 42 consist of the anatomical landmarks, the secondary landmarks and the dividing landmarks which suitably dividing the distance between the anatomical/secondary landmarks.

(10) This invention relates to the above network system and it is desirable
"foot shape information" stored in the user terminal 41 has more than 4 "cross section data" and
"foot shape information" distributed from the server machine 41 has more than 4 "cross section data" of which position corresponds to the cross section data stored in the user terminal 41.

(11) Shoe Selection System

This invention enables the shoe-selector to select the suitable shoes for the customer by the following way:

This is the shoe-selection system which consists of the electro optical foot scanner 67 and the computer, and
the computer stores "ideal foot shape information"
has a function to produce "foot shape information" containing either of the cross section data of the above (A)~(K) defined based on the anatomical landmarks by the measured foot shape
has a function to compare this "foot shape information" with the above "ideal foot shape information"
has a function to select the fit shoes by the result of the comparison By this way, by comparing the cross section forms containing the foot feature points besides the size and length of foot, it will be possible to select the better fitting shoes than ever before. The speedy selection of the shoes also can be made by using the electro optical foot scanner.

"Ideal foot shape information" described herein is the three dimensional foot form information not for the shoe but for the foot which to be considered most suitable for each pair of shoes, and this information is generally produced by each shoe-maker.

This ideal foot shape information represents the ideal foot forms three dimensionally but it is required to have the same cross section data as foot shape information (having the cross section data) which to be compared in this invention.

BRIEF DESCRIPTION OF THE DRAWINGS

FIG. 1*a*, FIG. 1*b*, FIG. 1*c*, FIG. 1*d*:
Drawing to show the anatomical landmarks of foot
FIG. 6: Block diagram to show the flowchart of the comparison device and the shoe-selection device

BEST WAY TO EMBODY THIS INVENTION

Figure 1B:
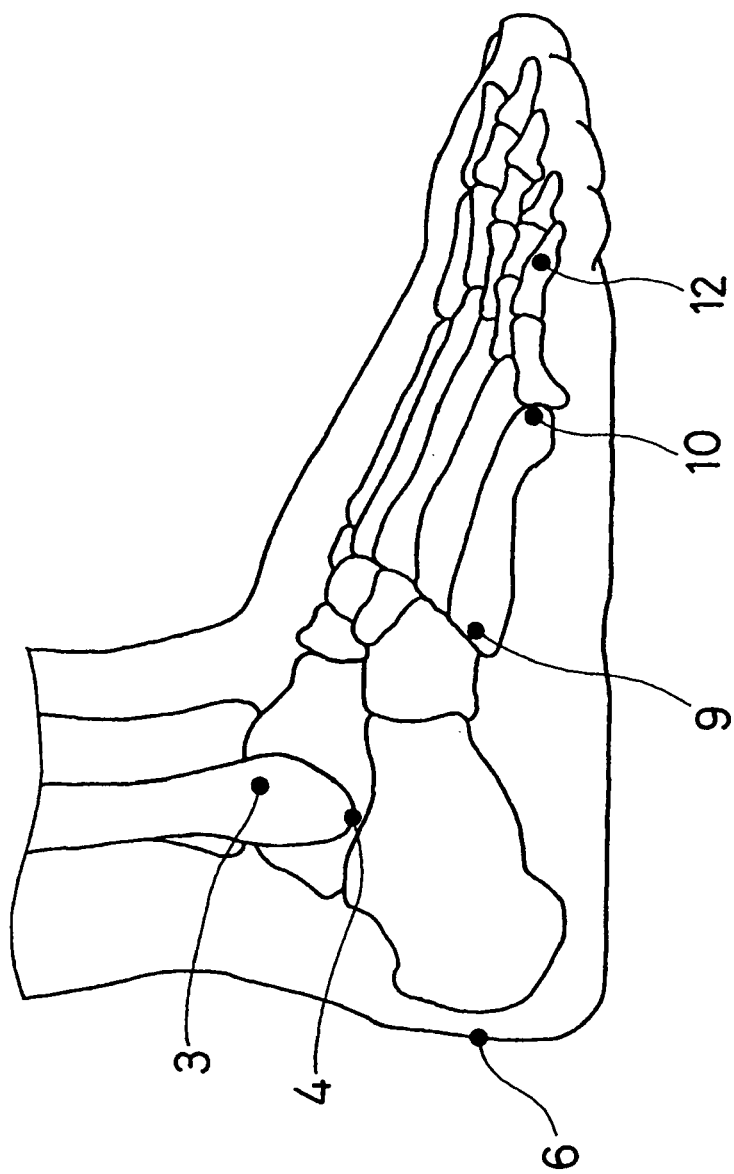

1. Foot Shape Information
Description of Each Cross Section Data (1) The point of this invention is to show the three dimensional foot forms by the outline of various cross sections defined based on the anatomical landmarks.

Figure 2A:
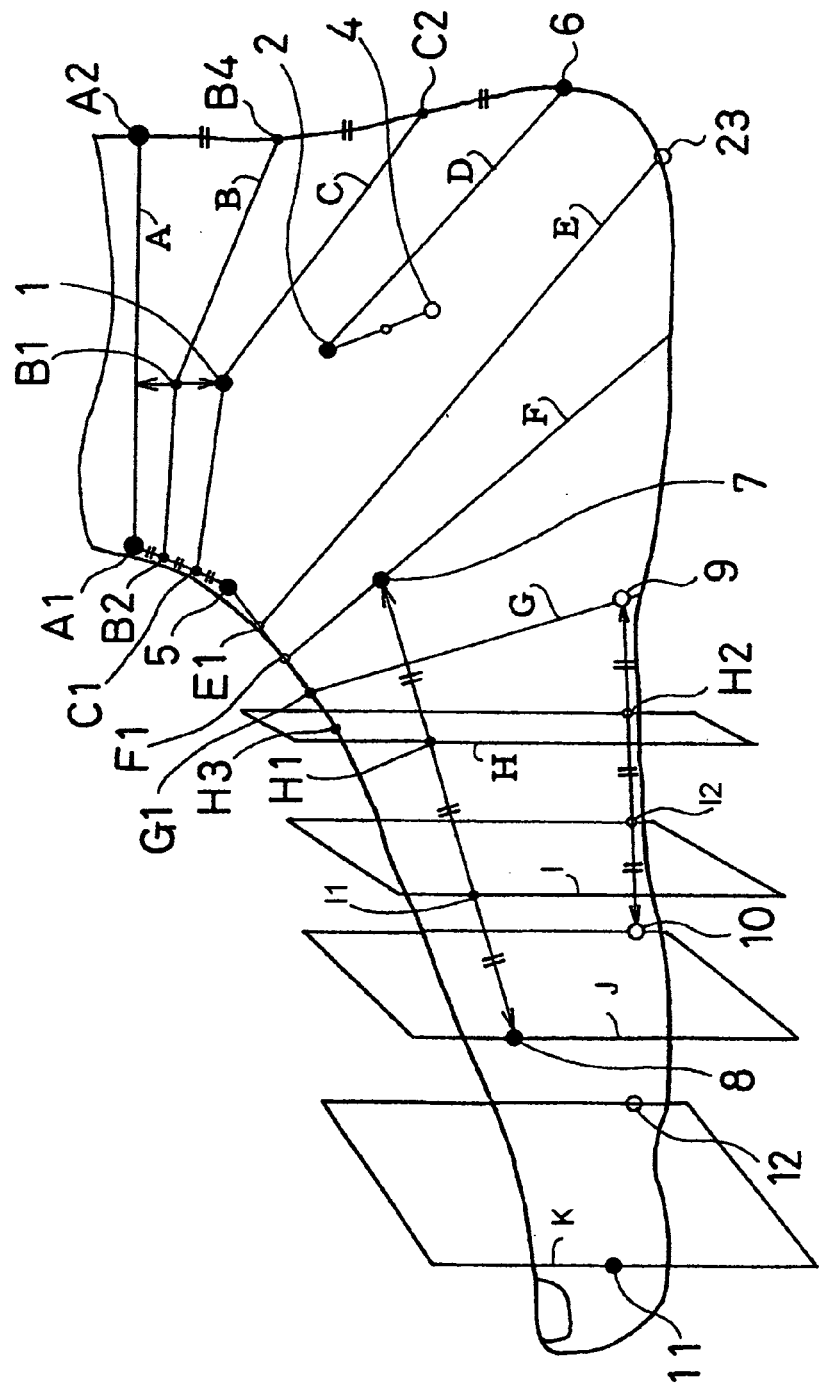
FIG. 2*a*, FIG. 2*b*, FIG. 2*c*, FIG. 2*d*, FIG. 2*e*, FIG. 2*f*:
Drawing to show the position of each cross section and the landmarks
Figure 2B:
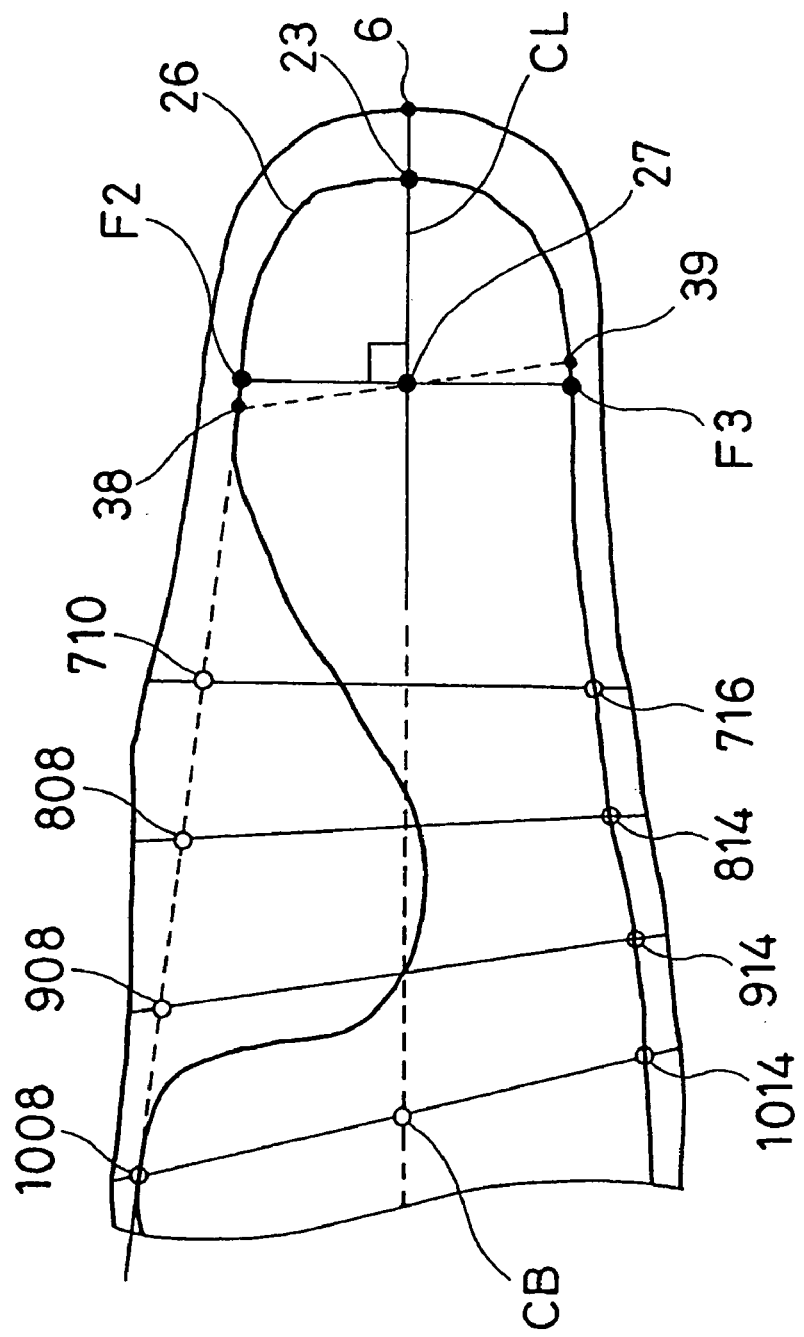
Figure 2C:
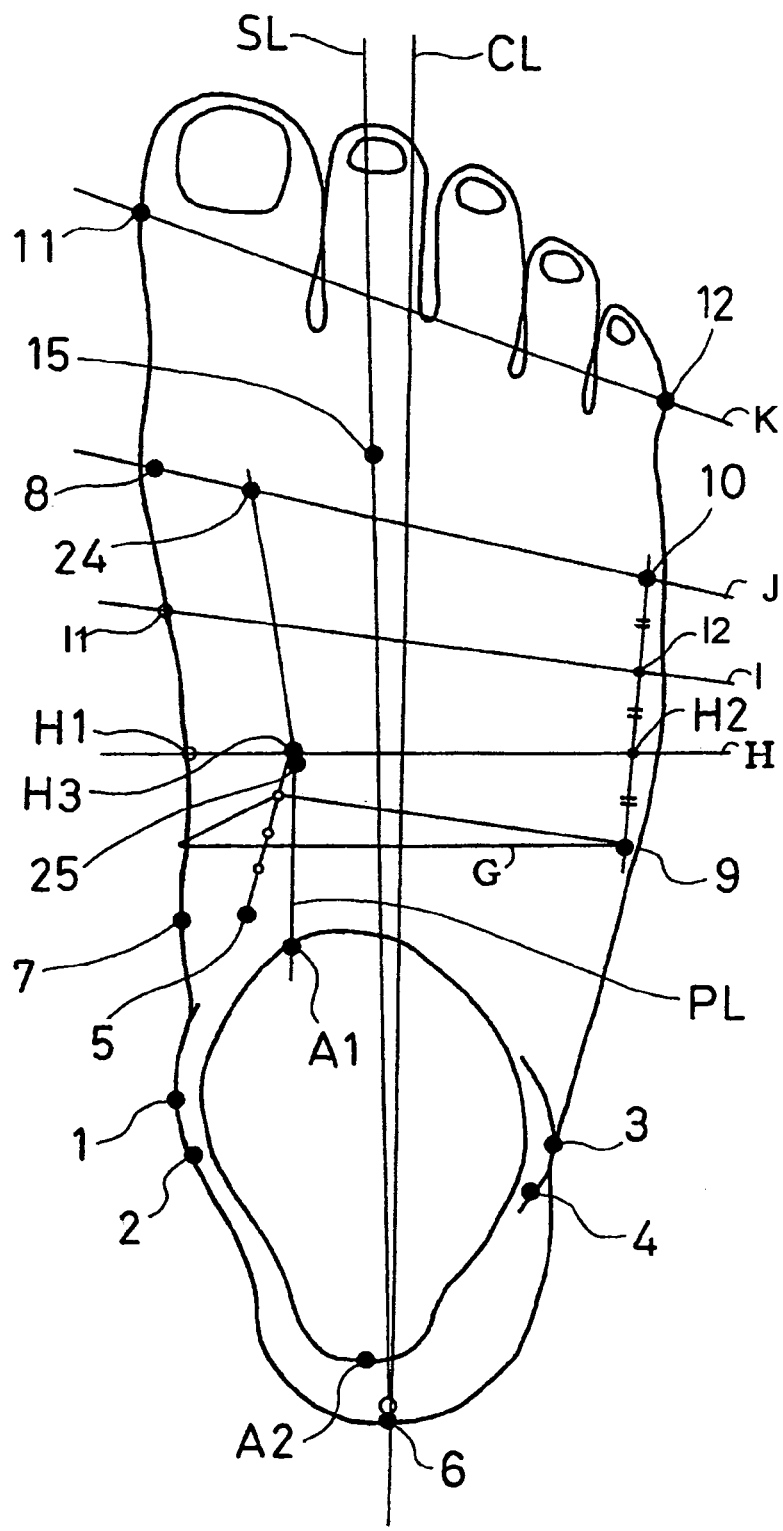
Figure 2D:
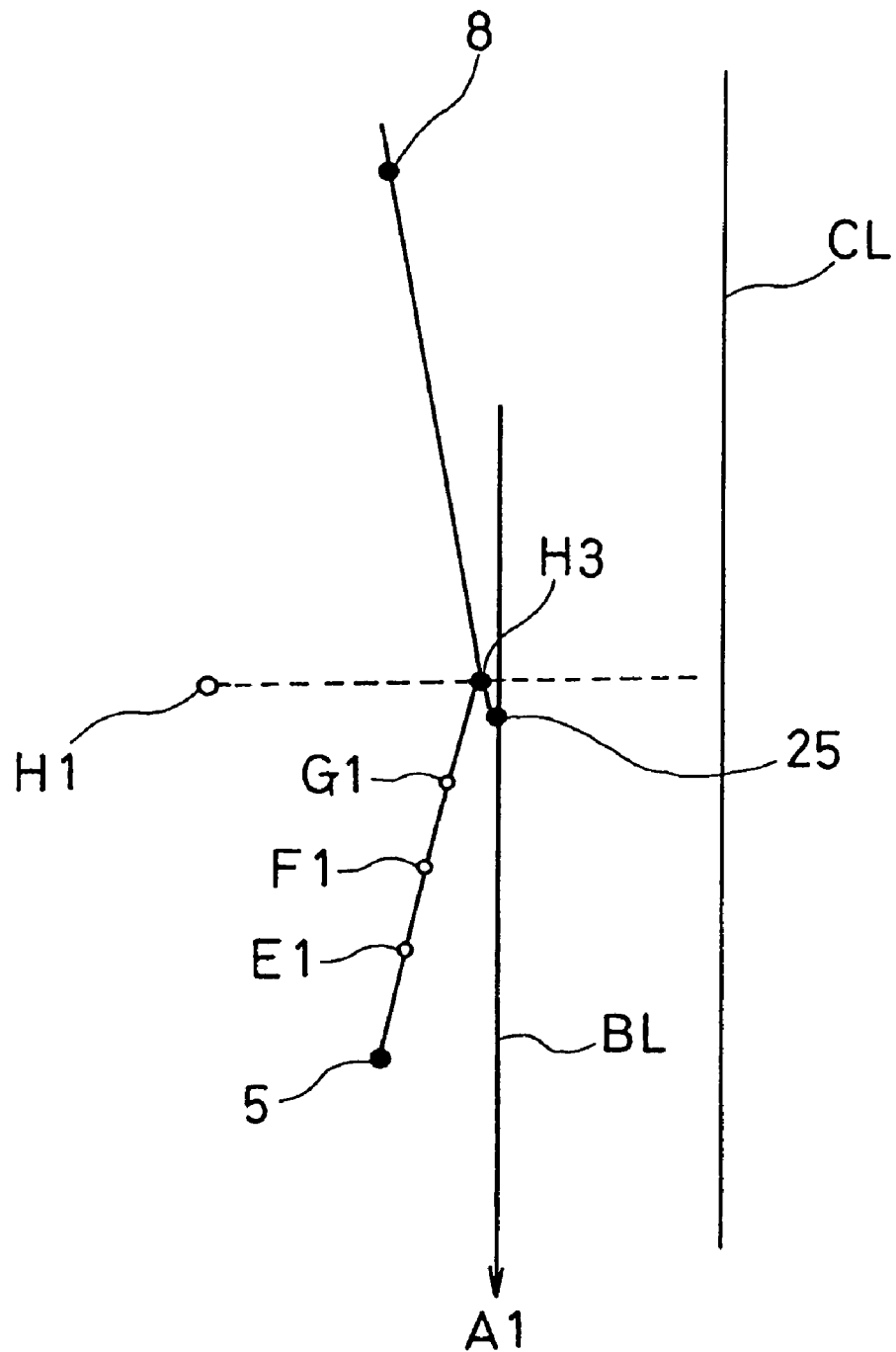
Figure 2E:
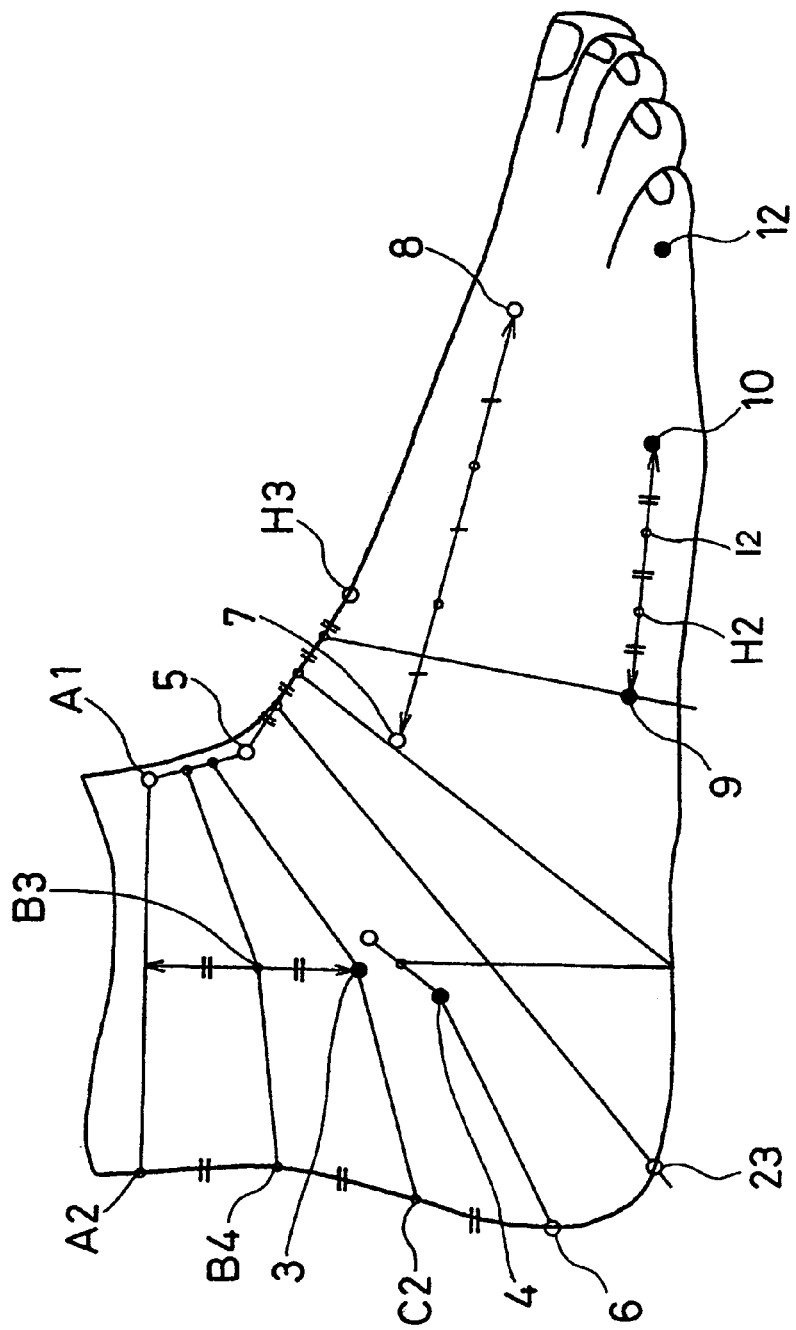
Figure 2F:
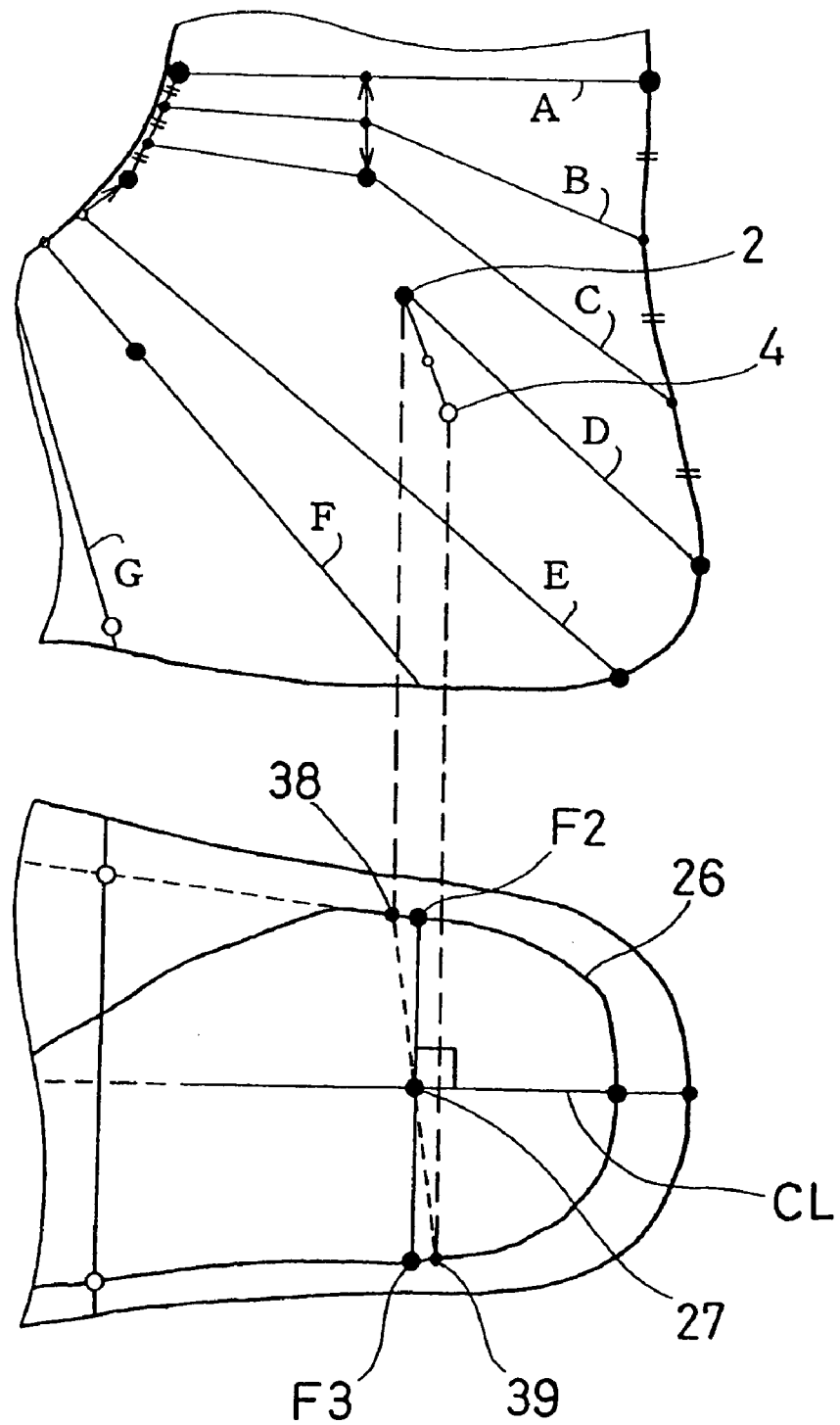

The data specifying the outline of each cross section is defined as the cross section data and exemplified below are the cross section data of FIG. 3a–FIG. 3k, referred to the drawing of the anatomical landmarks of foot (shown in FIG. 1a–FIG. 1d) and the position of each cross section and the landmarks (shown in FIG. 2a–FIG. 2f):

FIG. 2a: the position of each cross section and the landmarks of the right foot viewing from the medial malleolus FIG. 2b: the landmarks defining each cross section of the sole of the right foot FIG. 2c: the position of each cross section and the landmarks of the right foot viewing from the above FIG. 2d: the enlarged diagram near the tendon point (H3) of the cross section H at the dorsal part of the right foot FIG. 2e: the position of each cross section and the landmarks viewing from the lateral malleolus FIG. 2f: the corresponding diagram of the medial malleolus of the right heel and the sole of the right foot The relation of positions of the cross section (A) to (K) is shown in FIG. 2a. The cross section A is the horizontal cross section near the ankle. The position of the cross section will move towards the toes advancing to the cross section B, C, etc., and the cross section from (H) to (K) is the vertical cross section of the toes.

The position of each cross section is defined based on the anatomical landmarks of the foot bones. The visual points in the diagram of FIG. 2a–FIG. 2f are denoted by ● and the points projected from the opposite side are denoted by ○.

(2) This cross section data is to represent the outline of the cross section and can be shown on the plane as in FIG. 3a–FIG. 3k. However this cross section data is not the two dimensional data but the three dimensional data having the position of the measured foot and its inclination.

This cross section data is not specially formularized and such various kinds of data as the set of the coordinates, the combination of the coordinates and the function, etc. can be employed.

The following embodiment is by way of the cross section data which consists of the data of the three axes of the coordinates.

(3) This invention can be embodied by use of the landmarks of the above cross section data. "Landmarks" are the points on the outline of the cross section and the points to show effectively the feature of the cross section forms. That is, the landmarks mean the data points representing each cross section forms with less number of the data.

Each cross section data described below is the way of embodiment by the cross section data which consists of this landmark.

In the way of this embodiment, the following three are used as the landmarks:

1. the anatomical landmarks: the points defining the cross section
2. the secondary landmarks: the points coming from the anatomical landmarks and authorized to be as the feature in the cross section forms
3. the dividing landmarks: the points dividing suitably the distance between the above anatomical/secondary landmarks The cross section forms can be obtained efficiently with less number of the data by the landmarks consisting of the anatomical landmarks, the secondary landmarks, and the dividing landmarks which specified by suitably dividing the distance between the anatomical/secondary landmarks.

In FIG. 3a–FIG. 3k, the anatomical landmarks are denoted by •, the secondary landmarks by ⊙ and the dividing landmarks by ○, and the cross line with the vertical cross section including the foot axis CL is shown by the thick solid line.

(4) The data points of the cross section are not needed to consist of these landmarks alone but can consist of the combination of these landmarks with other data representing the outline of the cross section.

This invention can be embodied by way of measuring the dividing points which dividing equally the circumference of the cross section, but it is desirable that the landmarks should be defined as above in order to show efficiently the foot forms in the cross section.

(5) The number of landmarks and other data which consists of the cross section data can be determined according to the requirements. When the detailed comparison of the forms is required, the number of the data will be increased and the less number of the data will be used in case the less data size is required.

(6) In order to make the FFD analysis by the cross section data to compare the foot form information, each cross section data needs to have the respective corresponding data point (landmark).

The more precise comparison can be made with the more data points but too much data size will increase the calculation load and this invention's effectiveness of reducing the communication load will also be diminished.

The FFD analysis can be embodied by the cross section data which having the data points of 5~200 in each, but the cross section data of the data points of 10~100 is desirable in view of calculation and communication load.

(7) Described below are the cross section data which show efficiently the three dimensional features of the foot with less number of the data and suit the FFD analysis:

Cross Section A (1) The cross section A is the horizontal cross section positioning at the 1.6 times of the mean of the sphyrion height (HT1) and the sphyrion fibulare height (HT2).

Figure 1C:
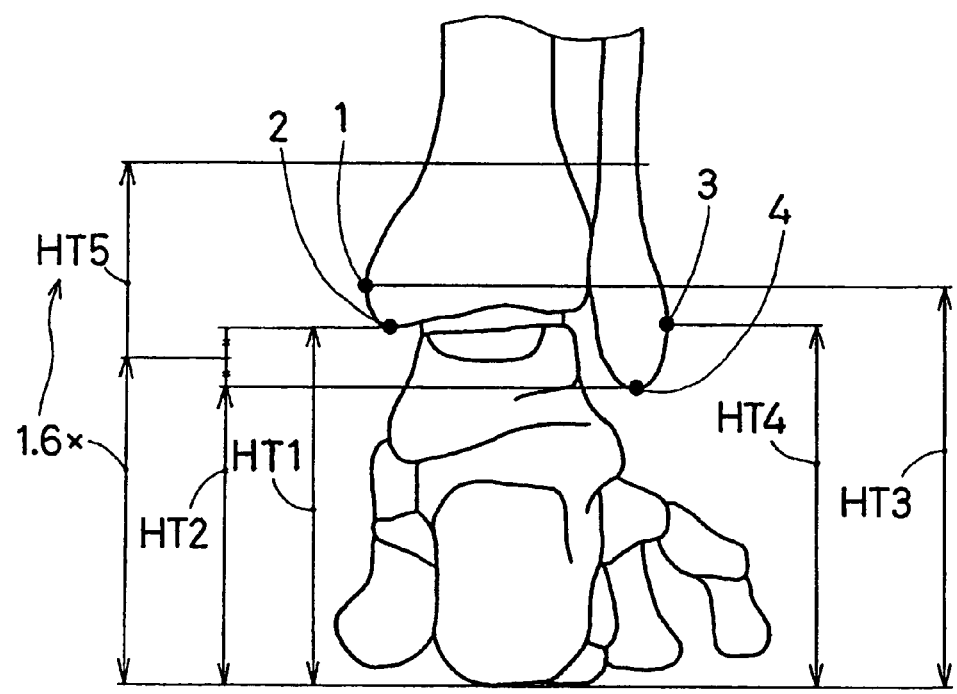
Figure 1D:
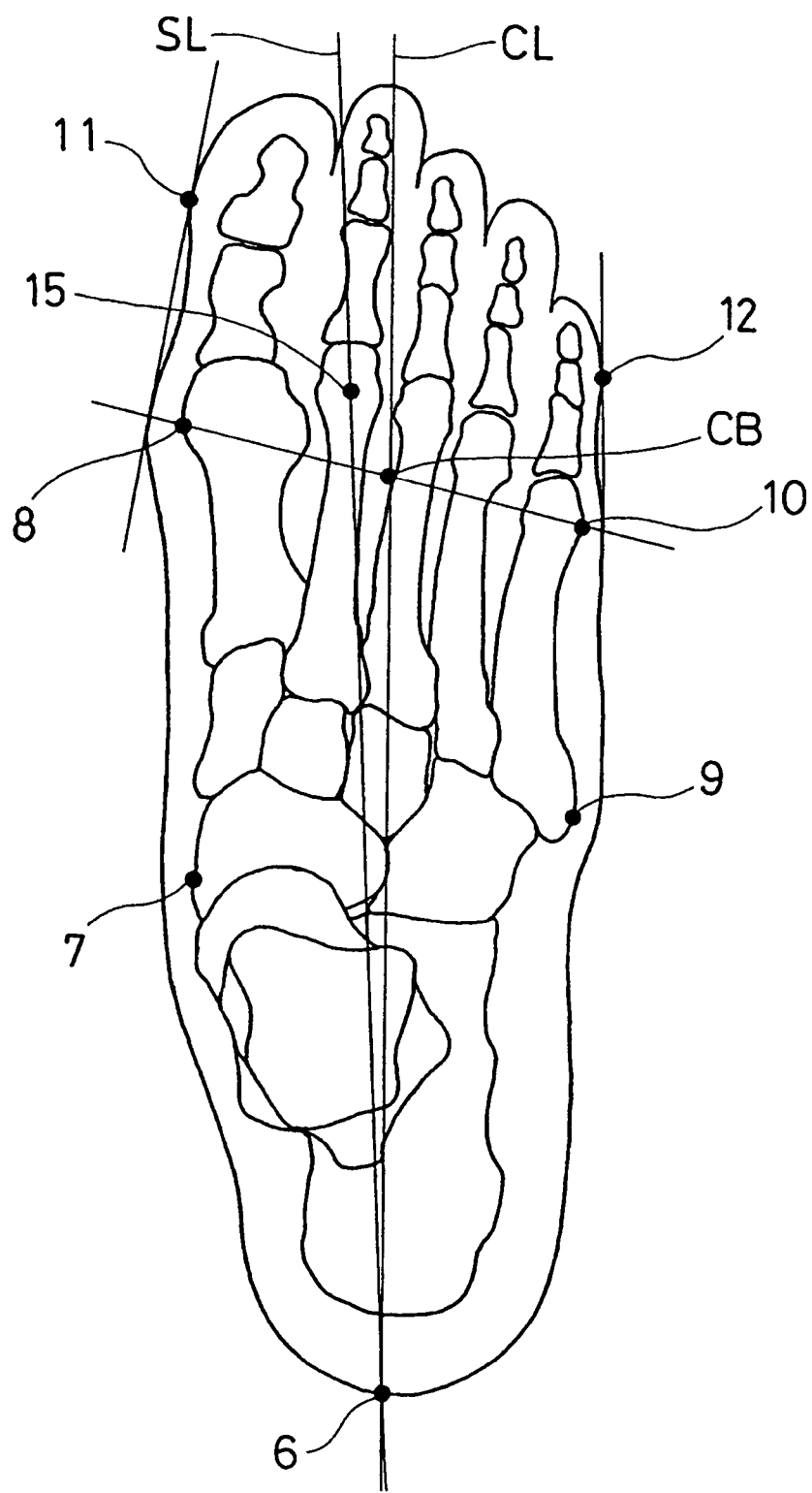

"The sphyrion 2" means the lower end of the medial malleolus shown in FIG. 1a and its height is shown as HT1 in FIG. 1c.

"The sphyrion fibulare 4" means the lower end of the lateral malleolus shown in FIG. 1b and its height is shown as HT2 in FIG. 1c.

The cross section A means the horizontal cross section positioning at the 1.6 times of the mean of HT1 and HT2.

Figure 3A:
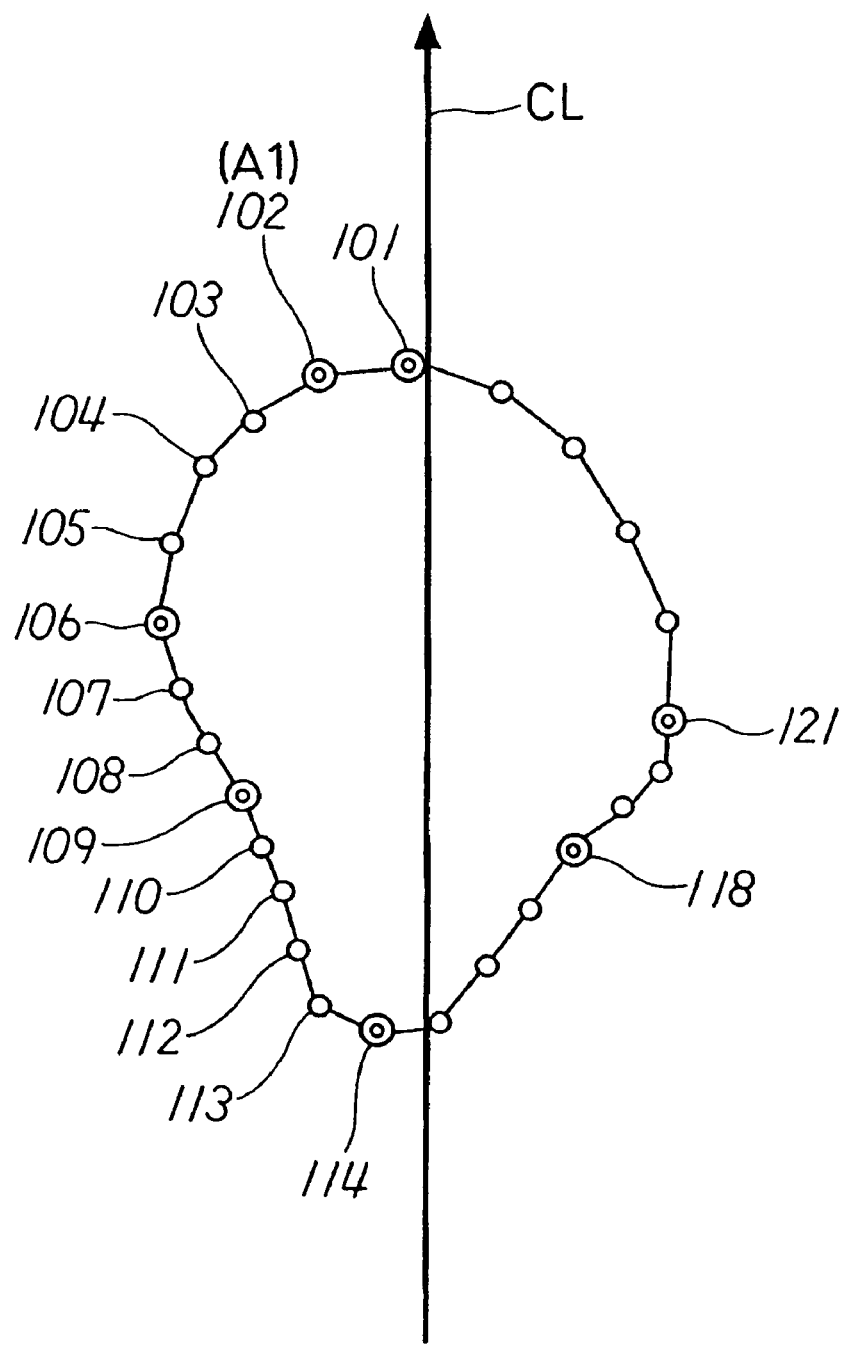
FIG. 3*a*~FIG. 3*k*: Drawing to show each cross section data

(2) The cross section A data is shown in FIG. 3a.

FIG. 3a shows the cross section data of the cross section A having 25 landmarks which are numbered counterclockwise from the data point 101.

(3) The explanation of the cross section A (FIG. 3a) is as below:

First of all, the cross section A does not have any anatomical landmarks.

However, the height of this cross section is defined by the two anatomical landmarks, sphyrion 2 and sphyrion fibulare 4.

Therefore, even if any anatomical landmark is not on the outline of the cross section, cross sections such as this cross section A in this invention are defined based on anatomical landmarks.

The definitions of the secondary landmarks are described below:

data point 101: the point closer to the toe of the 2 intersection points of the cross section A and the vertical plane having the foot axis 2 SL.

data point 102: the point closer to toe of the 2 intersection points of the cross section A and the vertical plane having the posterior tendon parallel line BL (FIG. 2d, BL) that passes through the posterior tendon point 25 and parallel to the foot axis CL. This point is the anterior point A1 of cross section A.

data point 106: the medial intersection point of the cross section A and the vertical plane perpendicular to the foot axis CL, passing through the most prominent point 1 of medial malleolus data point 109: the most concave point at the part posterior to the medial malleolus data point 114: the most posterior prominent point at the middle of the Achilles tendon data point 118: the most concave point at the part posterior to the lateral malleolus data point 121: the lateral intersection point of the cross section A and the vertical plane perpendicular to the foot axis CL, passing through the most prominent point 3 of lateral malleolus.

Then the dividing landmarks are defined as the data points which fill the surface distance between the anatomical/secondary landmarks. They are defined as the points that divide the surface distance between the two landmarks into several parts of the equal length. This definition of dividing points applies to all dividing points hereafter.

data point 103,104,105: 3 dividing points on the cross section A that divide the surface distance between the data point 102 and 106 into 4 equal length parts.

data point 107,108: 2 dividing points on the cross section A that divide the surface distance between the data point 106 and 109 into 3 equal length parts.

Other points are also obtained by the same method mentioned above.

The number of dividing points between the two anatomical/secondary landmarks can be decided by users, and landmarks between 5 and 200 on a cross section in total are sufficient.

The horizontal cross section in the definition of cross section A means the horizontal plane to the standing surface, but the inclination of the angle of 0~3 degrees can be accepted as the horizontal plane, since horizontality being not so strictly required.

This cross section A specifies the form around the ankle.

Cross Section B (1) The cross section B consists of two cross sections, the cross section Ba at the toe side, and the cross section Bb at the heel side.

(2) The cross section Ba is the cross section passing through the following 3 points:
  the first point (B1) is on the ankle surface just above the most prominent point 1 of the medial malleolus at the average height of the height (HT5) of the cross section A and the height (HT3) of the most prominent point 1 of medial malleolus (B1 in FIG. 2a). "Height of the cross section A" is shown as HT5 in FIG. 1c. "Height of the most prominent point 1 of medial malleolus" is HT3 in FIG. 1c.
  the second point (B2) is the dividing point closer to the anterior point A1 of cross section A of the 2 dividing points that divide the surface distance between the anterior point A1 of cross section A and the junction point 5 into 3 equal length parts (B2 in FIG. 2a).
  the third point (B3) is on the ankle surface just above the most prominent point 3 of the lateral malleolus at the average height of the height (HT5) of the cross section A and the height of the most prominent point 3 of lateral malleolus (B3 in FIG. 2e). The "most prominent point 3 of lateral malleolus" means the most laterally prominent point of the lower end of fibula shown in FIG. 1c, and "height of the most prominent point 3 of lateral malleolus" is HT4 in FIG. 1c.

(3) The cross section Bb is the cross section passing through the following 3 points:
  the first point (B1) is on the ankle surface just above the most prominent point 1 of the medial malleolus at the average height of the height (HT5) of the cross section A and the height of the most prominent point 1 of medial malleolus (B1 in FIG. 2a).
  the second point (B4) is the dividing point closer to the posterior point A2 of cross section A of the 2 dividing points that divide the surface distance between the posterior point A2 of cross section A and pternion 6 into 3 equal length pats (B4 in FIG. 2a).
  the third point (B3) is on the ankle surface just above the most prominent point 3 of lateral malleolus at the average height of the height (HT5) of the cross section A and the height of the most prominent point 3 of lateral malleolus (B3 in FIG. 2e).

Here, "posterior point A2 of cross section A" means the most posterior prominent point at the middle of the width of Achilles tendon on the cross section A, and it is shown as point A2 in FIG. 2a.

Figure 3B:
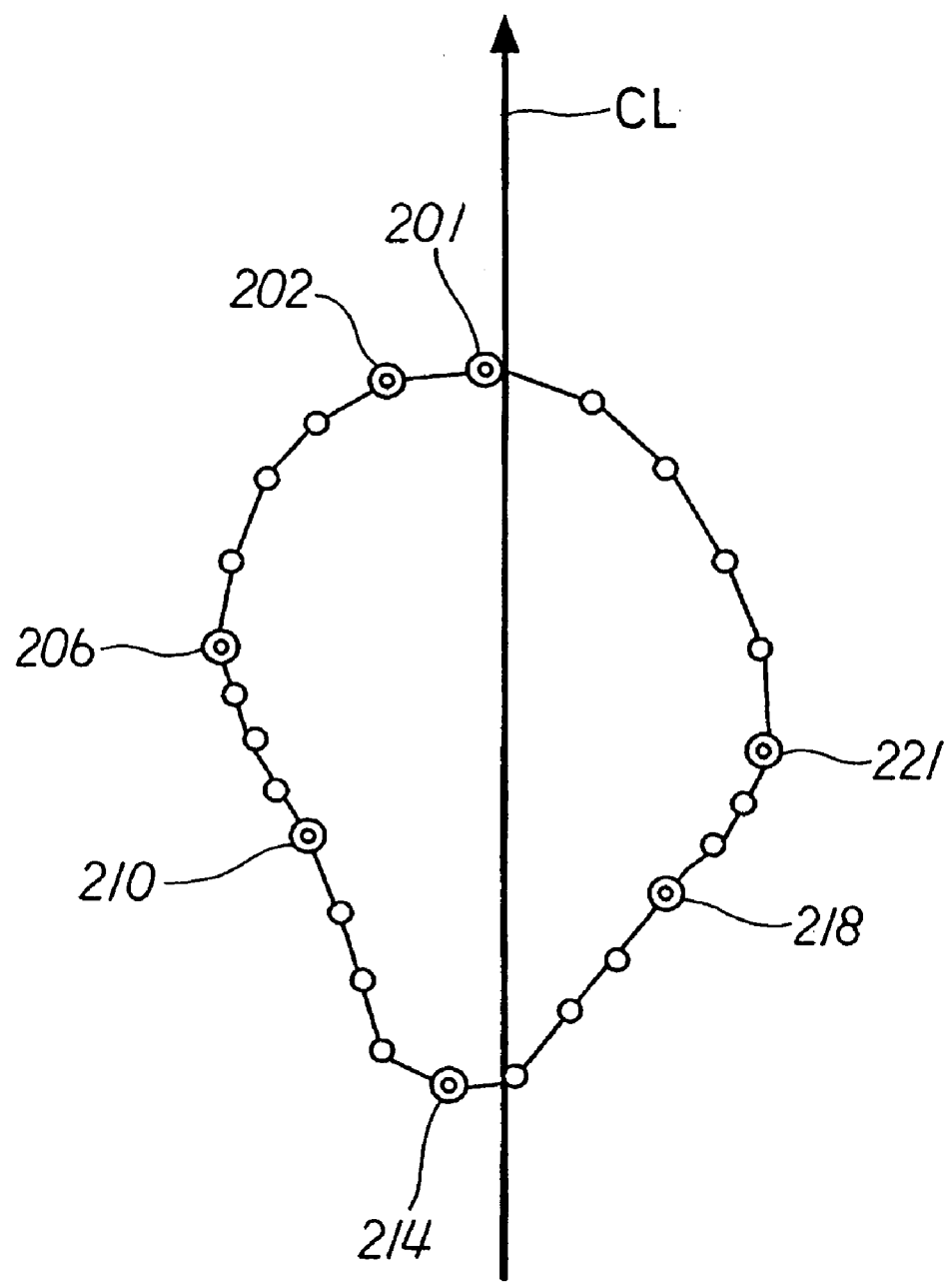

(4) The cross section data in the cross section B is shown in FIG. 3b.

The cross section B has 25 landmarks like the cross section A and has no anatomical landmarks in the cross section data.

Secondary landmarks are described below:

data point 201: the point closer to the toes of the 2 intersection points of the cross section A and the vertical plane having the foot axis 2 SL.

data point 202: the point closer to toes of the 2 intersection points of the cross section A and the vertical plane having the posterior tendon parallel line BL that passes through the posterior tendon point 25 and parallel to the posterior tendon parallel line BL.

data point 206: the medial intersection point of the cross section A and the vertical plane perpendicular to the foot axis CL passing through the most prominent point 1 of medial malleolus.

data point 210: the most concave point at the part posterior to the medial malleolus.

data point 214: the most posterior prominent point at the middle of the width of the Achilles tendon.

data point 218: the most concave point at the part posterior to the lateral malleolus.

data point 221: the lateral intersection point of the cross section A and the vertical plane perpendicular to the foot axis CL and passing through the most prominent point 3 of lateral malleolus.

The dividing landmarks are defined so that the surface distance between the secondary/anatomical landmarks are divided into several equal length parts properly.

Thus the cross section B data can specify the complicated foot form at the ankle with smaller number of data points.

Cross Section C (1) The cross section C consists of two cross sections, cross section Ca at the toe side and the cross section Cb at the heel side.

(2) The cross section Ca is the cross section passing through the following 3 points:

the first point is the most prominent point 1 of the medial malleolus.

the second point is the most prominent point 3 of the lateral malleolus.

the third point (C1) is the dividing point closer to the junction point 5 of the 2 dividing points that divide the surface distance between the anterior point A1 of the cross section A and the junction point 5 (C1 in FIG. 2*a*).

(3) The cross section Cb is the cross section passing through the following 3 points:

the first point is the most prominent point 1 of the medial malleolus.

the second point is the most prominent point 3 of the lateral malleolus.

the third point (C2) is the dividing point closer to the pternion 6 of the 2 dividing points that divide the surface distance between the posterior point A2 of cross section A and the pternion 6 (C2 in FIG. 2*a*).

Here, the first and second points are anatomical landmarks.

Figure 3C:
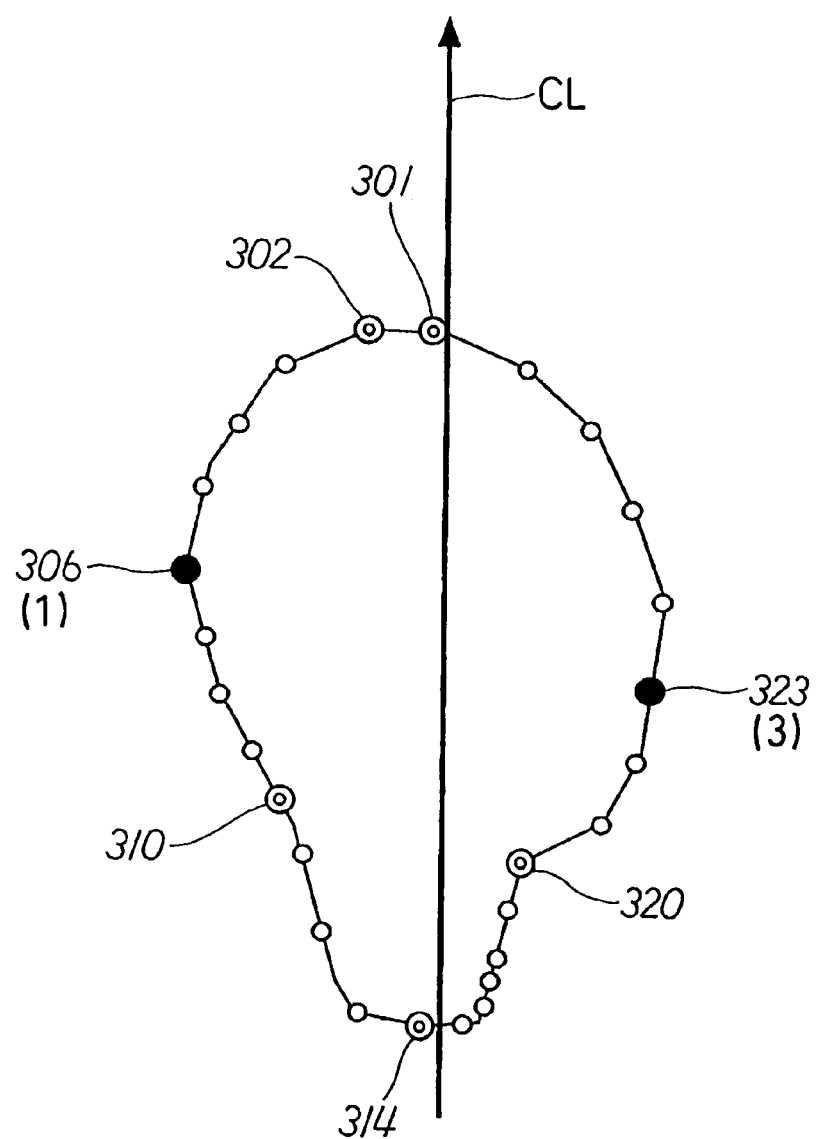

(4) The cross section C data is shown in FIG. 3*c*.

This cross section C has 27 landmarks.

Anatomical landmarks are described below:

data point 306: the most prominent point 1 of the medial malleolus.

Data point 323: the most prominent point 3 of the lateral malleolus.

Secondary landmarks are described below:

data point 301: the toe side intersection point of the cross section A and the vertical plane having the foot axis 2 SL.

data point 302: the intersection point of the cross section A and the vertical plane having the line passing through the posterior tendon point 25 and parallel to the posterior tendon parallel line BL.

data point 310: the most concave point at the part posterior to the medial malleolus.

data point 314: the most posterior prominent point at the middle of the width of the Achilles tendon.

data point 320: the most concave point at the part posterior to the lateral malleolus.

The dividing landmarks are defined by dividing surface distances between the anatomical/secondary landmarks into several equal length parts properly.

Larger number of dividing landmarks is defined for the part of cross section outline between the landmarks 314 and 320, because this part has complex foot shape.

By using the cross section data thus defined, it is possible to specify the complex shape around Achilles tendon with a small number of data points.

Cross Section D (1) The cross section D is the cross section passing through the sphyrion 2, the sphyrion fibulare 4 and the pternion 6

Figure 3D:
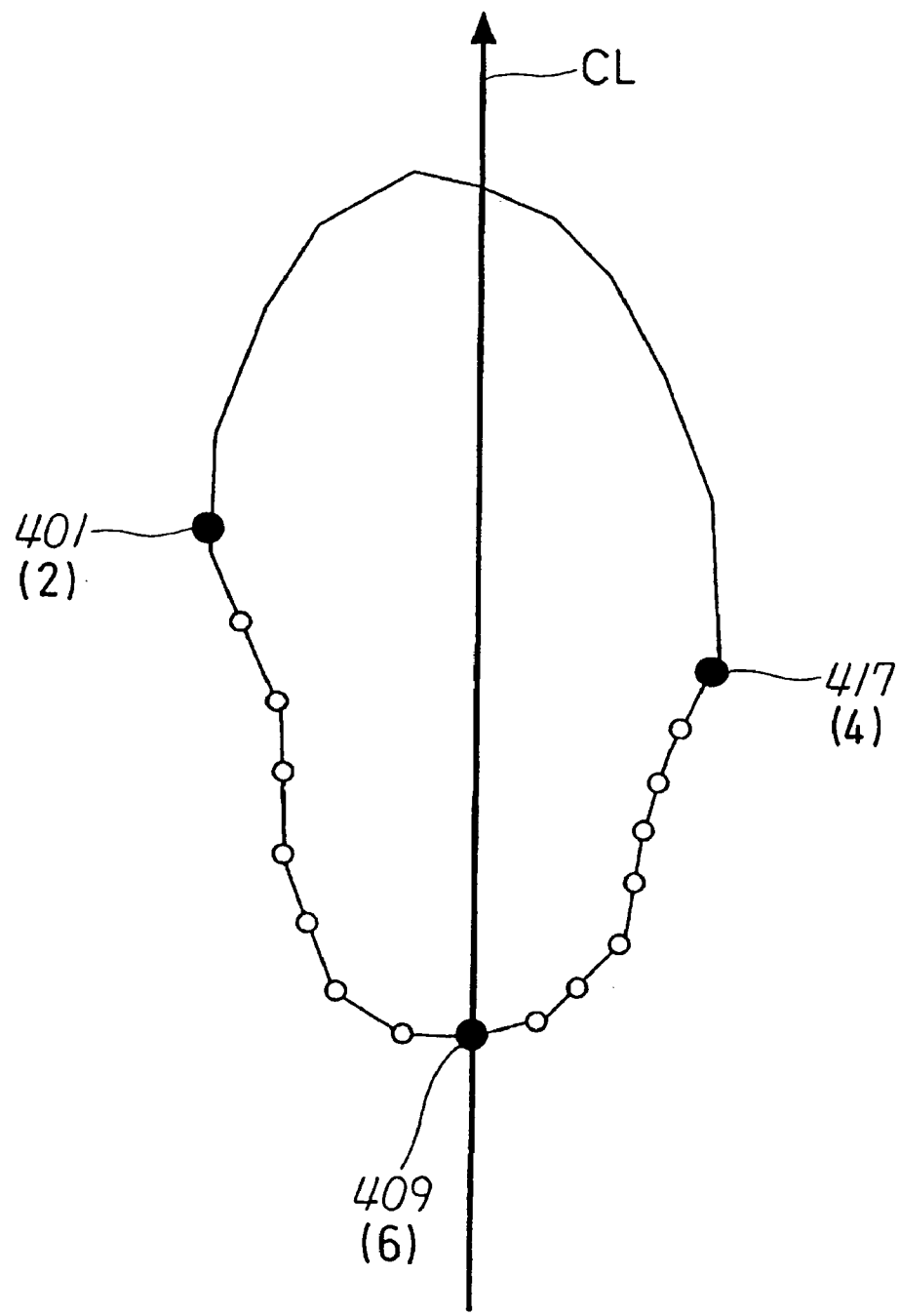
Figure 3E:
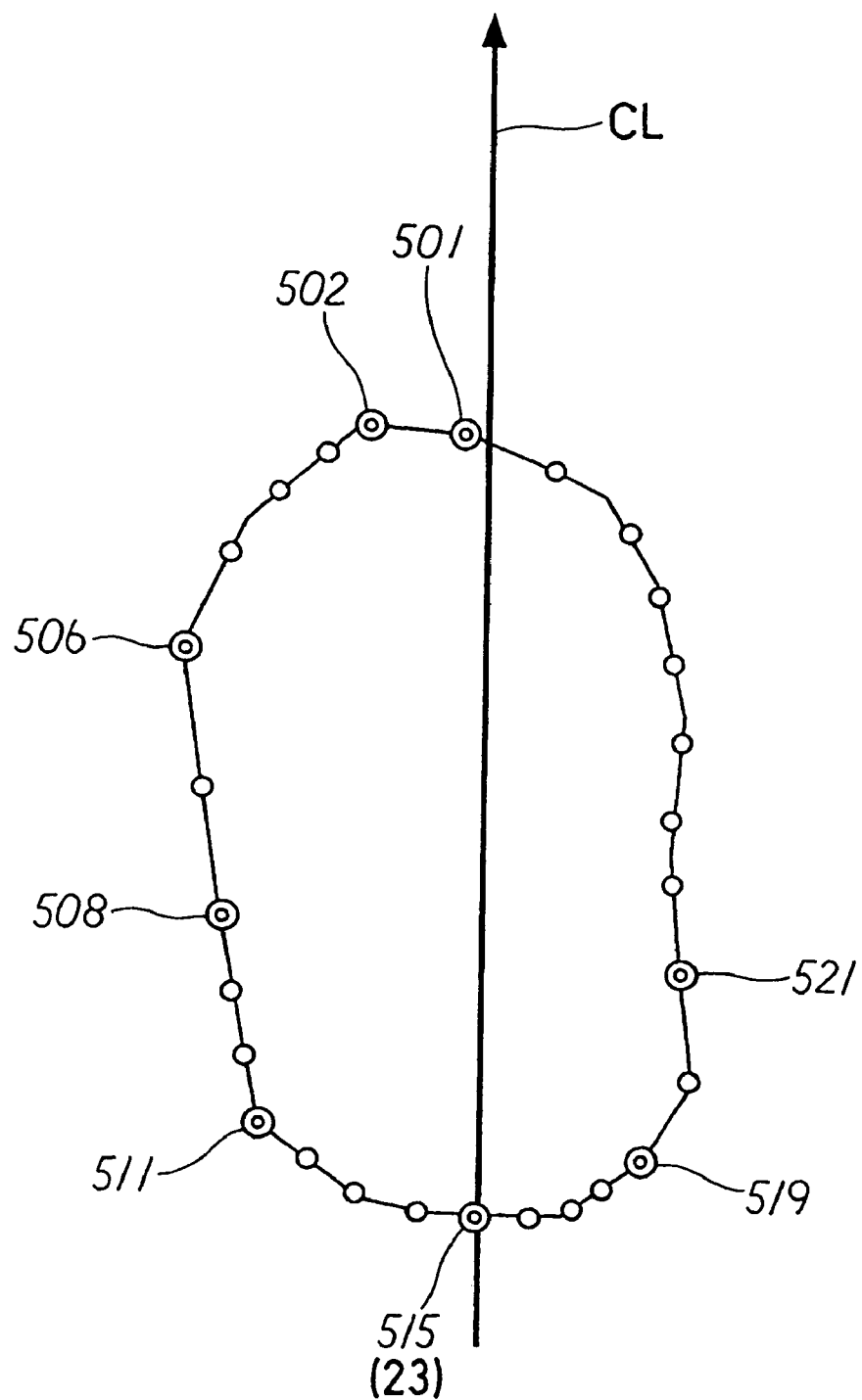

(2) The cross section D is shown in FIG. 3*d*.

This cross section D has 17 landmarks.

Anatomical landmarks are described below:

data point 401: the most prominent point 1 of the medial malleolus.

data point 409: the pternion 6.

data point 417: the most prominent point 3 of the lateral malleolus.

This cross section does not have any secondary landmarks.

The dividing landmarks are defined as the points that divide each of surface distance between the landmarks 401 and 409 or the surface distance between the landmarks 409 and 417 into 8 equal length parts.

It is possible to use partial circumference outline of cross section as in the case of cross section D, in which only the posterior half of a circumference is used.

(3) The reason why a partial cross section is acceptable as the data is because the aim to use this cross section is to specify the morphology of the heel.

Thus, it is possible for user to set and/or change the number of landmarks and their locations in each cross section.

This cross section D with the cross section E can specify the form and the circumference around the heel with a small data size.

The landmark sphyrion fibulare 4 (data point 417) is used to define the cross section D, and is one of the landmarks consisting of the cross section D data. The sphyrion fibulare 4 should be located above the top line of the shoe.

Therefore the design of the shoe top line can be made based on the location of sphyrion fibulare 4.

Cross Section E (1) The cross section E is vertical to the sagittal plane having the foot axis CL, passing through the following 2 points:

the first point is the heel contact point 23.

the second point is the dividing point (E1) nearest to the junction point 5 of the 3 dividing points that divide the surface distance between the tendon point (H3) of cross section H and the junction point 5 into 4 equal length parts.

(2) This cross section E has 28 landmarks.

Cross section E does not have any anatomical landmarks.

Secondary landmarks are described below:

data point 501: the point located on the dorsal part of the foot of the 2 intersection points of the cross section E and the vertical plane having the foot axis 2 SL.

data point 502: the point at the dorsal part of the foot of the 2 intersection points of the cross section E and the vertical plane passing through the posterior tendon point 25 and parallel to the posterior tendon parallel line BL data point 506: the intersection point on the foot surface of the cross section E and the line on the foot surface connecting the sphyrion 2 and the navicular bone point 7 data point 508: the medial intersection point of the cross section E and the vertical plane perpendicular to the foot axis CL, and passing through the sphyrion 2 data point 515: the heel contact point 23.

Other landmarks 511, 519 and 521 are also defined.

Dividing landmarks between the secondary landmarks are defined by the method already described.

(3) A circumference measurement around the heel, similar to the cross section E has been measured and used as heel circumference for shoe design and manufacturing. Due to the inter-observer measurement errors in traditional manual measurements, plural foot data have not been compared, and the results of comparison could be erroneous.

However, this invention defined anatomical landmarks and clarified the measuring points from heel to the dorsum of the foot, so that it is possible to compare plural foot data which were measured and described based on the cross section E definition, even if measured by different observers.

In this invention, the cross section E is defined including the heel contact point 23, and this helps to reduce the measurement error by clarifying the location to measure.

Cross Section F (1) The cross section F is the cross section passing through the following 3 points:
  the first point (F1) is the midpoint of the tendon point (H3) of the cross section H and the junction point 5 (F1 in FIG. 2*d*).
  the second point (F2) is the medial intersection point of the line passing through the foot axis junction point 27 and perpendicular to the foot axis CL and the outline of the foot contact area of sole 26 (F2 in FIG. 2*f*)
  the third point (F3) is the lateral intersection point of the line passing through the foot axis junction point 27 and perpendicular to the foot axis CL and the outline of the foot contact area of sole 26 (F3 in FIG. 2*f*)

(2) This cross section F (FIG. 3*f*) has 23 landmarks.

This cross section does not have any anatomical landmarks.

Secondary landmarks are described below:

data point 601: the intersection point of the cross section F and the vertical plane having the foot axis 2 SL.

data point 602: the intersection point of the cross section F and the vertical plane having the line passing through posterior tendon point 25 and parallel to the posterior tendon parallel line BL.

data point 610,614: the medial/lateral intersection points of the cross section F and the outline of the foot contact area of sole 26.

data point 616: the most lateral point in the cross section F.

data point 607: the point on the cross section F that has the same height as the most medial point on the cross section G.

data point 612: the intersection point of the cross section F and the vertical plane having the foot axis CL.

data point 606: the intersection point of the cross section F and the line connecting navicular bone point 7 and sphyrion 2.

The dividing landmarks are obtained by the same method described before.

It is desirable to use navicular bone point 7 instead of the landmark 606 defined above, even if navicular bone point 7 does not always come up right on the cross section plane due to the variation in individual foot shapes.

Since the location of navicular bone point 7 represents the individual characteristic of foot morphology better than the landmark 606, it is desirable to use navicular bone point 7 for FFD analysis, even when this point located anterior to or posterior to the cross section F.

In this case, the landmark 606 does not locate on the plane defined above.

Figure 3F:
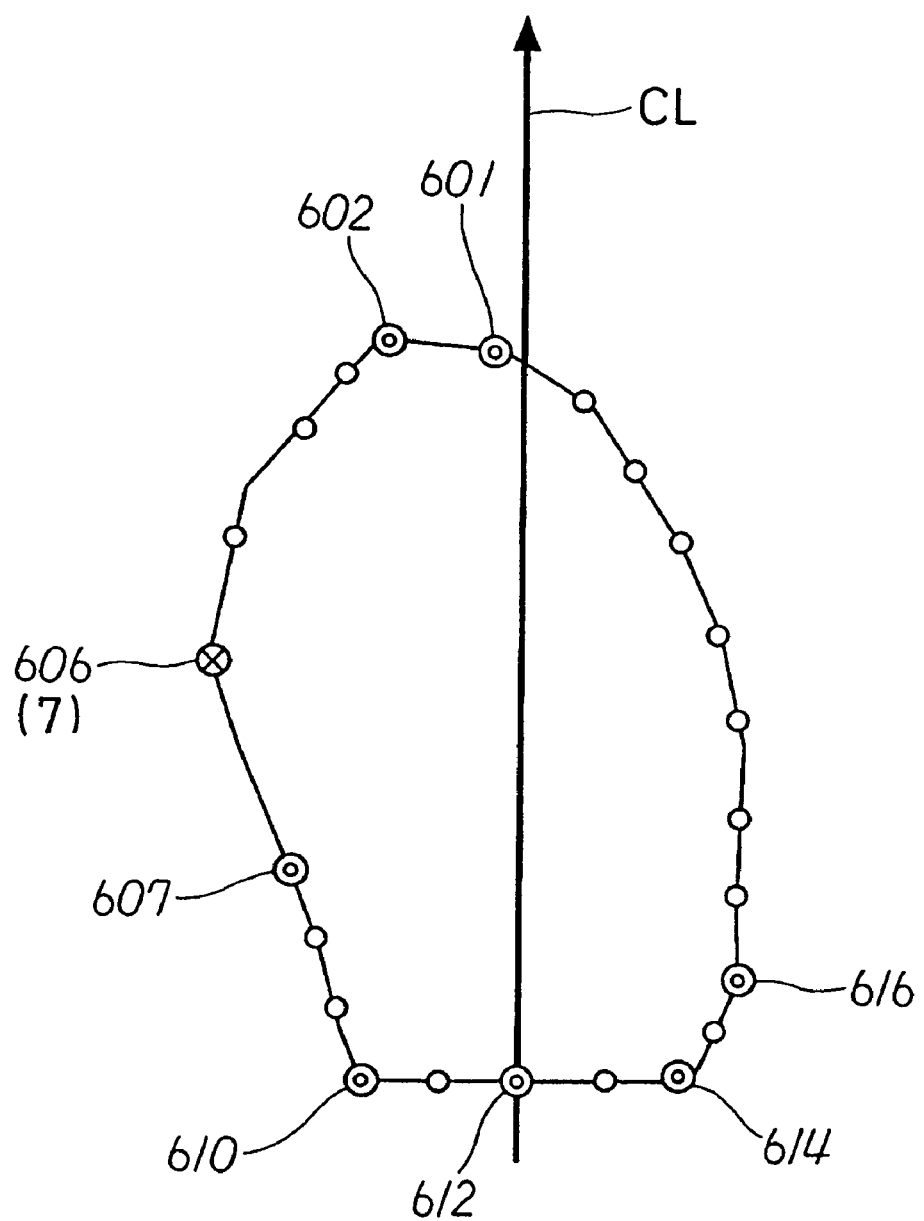
Figure 3G:
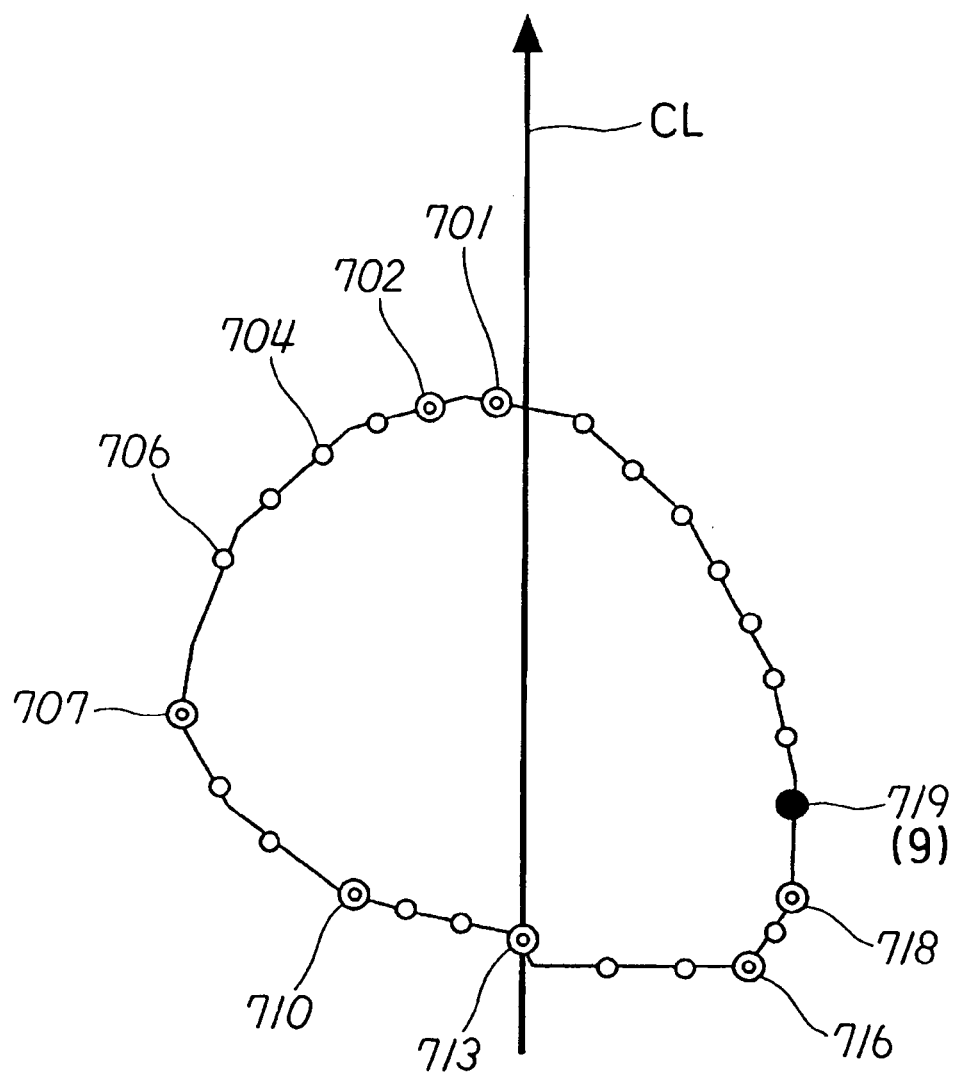

Here the most medial or lateral points mean the most medially or laterally prominent points in the cross section. In the cross section F, the landmark 606 is the most medial point, and the landmark 616 is the most lateral point (FIG. 3*f*).

Cross Section G (1) The cross section G passing through the following 2 points and vertical to the sagittal plane including the foot axis CL:
  the first point is 5th metatarsal tuberosity point 9
  the second point (G1) is the nearest point of 3 dividing points which come from the division of the surface distance between the tendon point (H3) of the cross section H and the junction point 5 into 4 equal length parts (G1 in FIG. 2*d*)

(2) The cross section G has 26 landmarks.

The anatomical landmark is below:

data point 719: 5th metatarsal tuberosity bone 9

Following are the secondary landmarks:

data point 701: the intersection point with the vertical cross section having foot axis 2 SL data point 702: the intersection point with the vertical cross section having posterior tendon parallel line BL data point 707: the most medial point data point 710: the intersection point with the line from the data point 610 of the cross section F to the data point 1108 of the cross section J described below data point 713: the intersection point with the vertical cross section having foot axis CL data point 716: the intersection point with the cross section G and the outline of the contact area of the sole 26 data point 718: the most lateral point

The dividing landmarks in the cross section G are defined by dividing surface distance between anatomical/secondary landmarks.

data point 704 and 706: the 2 dividing points on the surface distance between the point 702~707 into 3 equal length parts And other dividing landmarks are also obtained by equally dividing the surface distance between the point 702~704 and the point 704~706.

Like this way of the embodiment of this invention, the other dividing landmarks can be defined by suitably dividing the distance between the dividing landmarks, and the data point in the parts without any notable feature of the forms (i.e. the parts where exist no individual foot form differences of the persons whose measurements taken) can be deleted as in the case of the data point 706 and 707 in the cross section G.

Cross Section H (1) The cross section H is the vertical cross section passing through the following 2 points:
  the first point (H1) is the point near the navicular bone point 7 of the 2 dividing points which come from the division of the surface distance between the navicular bone point 7 and the metatarsal tibiale 8 into 3 equal length parts (H1 in FIG. 2*a*)
  the second point (H2) is the point near 5th metatarsal tuberosity point 9 of the 2 dividing points which come from the division of the surface distance between the metatarsale fibulare 10 and 5th metatarsal tuberosity point 9 into 3 equal length parts (H2 in FIG. 2*c*)

Figure 3H:
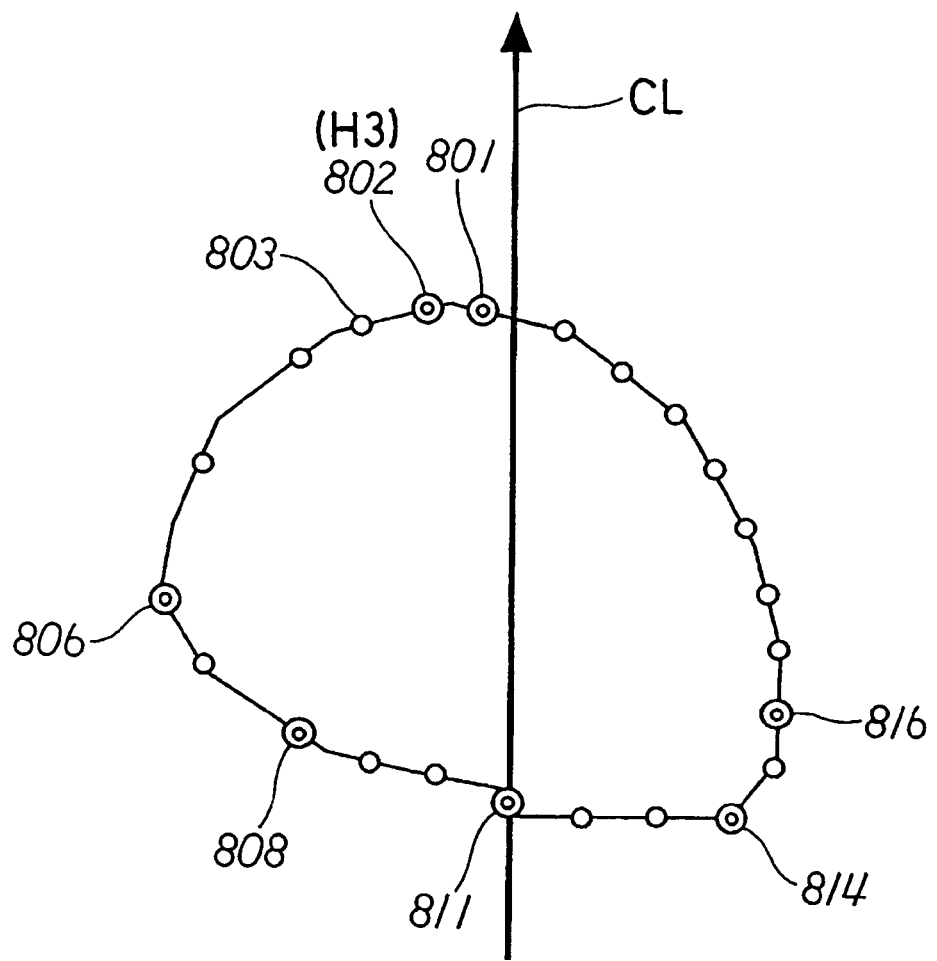
Figure 3I:
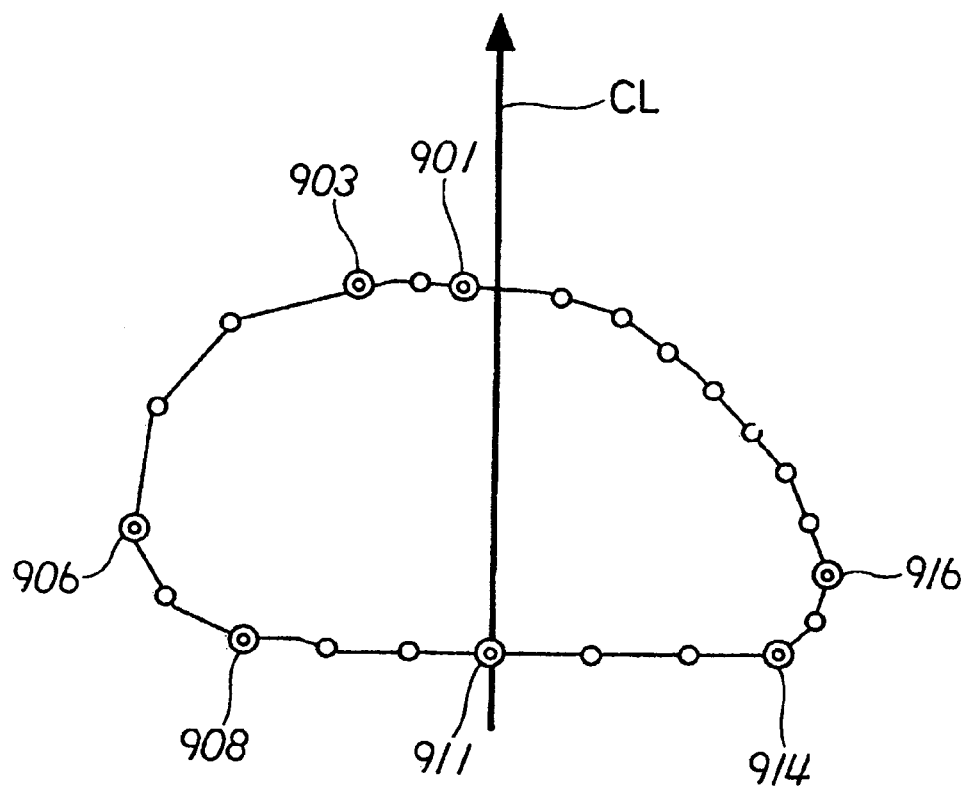

(2) The cross section H data is shown in FIG. 3h.

In this cross section data, each data point at the lower left is located at higher position than the data point at the lower right, which represents the forms of the foot arch.

The following are the secondary landmark definitions:

data point 801: the intersection point with the vertical cross section having foot axis 2 SL data point 802: the intersection point with the line from the anterior tendon point 24 to the posterior tendon point 25 with the cross section H ((the tendon point (H3) of the cross section H))

data point 806 and 816: the most prominent medial/lateral point data point 808: the intersection point with the line from the data point 601 in the cross section F to the data point 1108 of the cross section J described below data point 811: the intersection point with the vertical cross section having foot axis CL data point 814: the intersection point with the outline of the foot contact area of the sole 26

The dividing landmarks are defined by equally dividing the surface distance between the secondary landmarks.

In the cross section H data, the data point between the point 802~806 (except for 803) is obtained by dividing the surface distance into 3 equal length parts while the data point between the point 816~801 into 8 equal length parts. Since the individual foot form differences are bigger in the lateral part of the foot in the position of the cross section H. Thus, the cross section H data has less data points in the medial part and more data points in the lateral part of the foot. By this way, the number of the data point of the cross section data can suitably be set and/or changed upon the requirements. This cross section H can specify the forms of the foot arch with less data points.

The vertical cross section from (H) to (K) means the vertical plane to the standing surface, but the inclination of the angle of 0~3 degrees can be accepted to be authorized as the vertical plane since verticality being not so strictly required.

Cross Section I (1) The cross section I is the vertical cross section passing through the following 2 points:
the first point (I1) is the point near the metatarsale tibiale 8 of the 2 dividing points which come from the division of the surface distance between the metatarsale tibiale 8 and the navicular bone point 7 into 3 equal length parts (I1 in FIG. 2a)
the second point (I2) is the point near the metatarsale fibulare 10 of the 2 dividing points which come from the division of the surface distance between the metatarsale fibulare 10 and 5th metatarsale tuberosity point 9 into 3 equal length parts I2 in FIG. 2e)

Figure 3J:
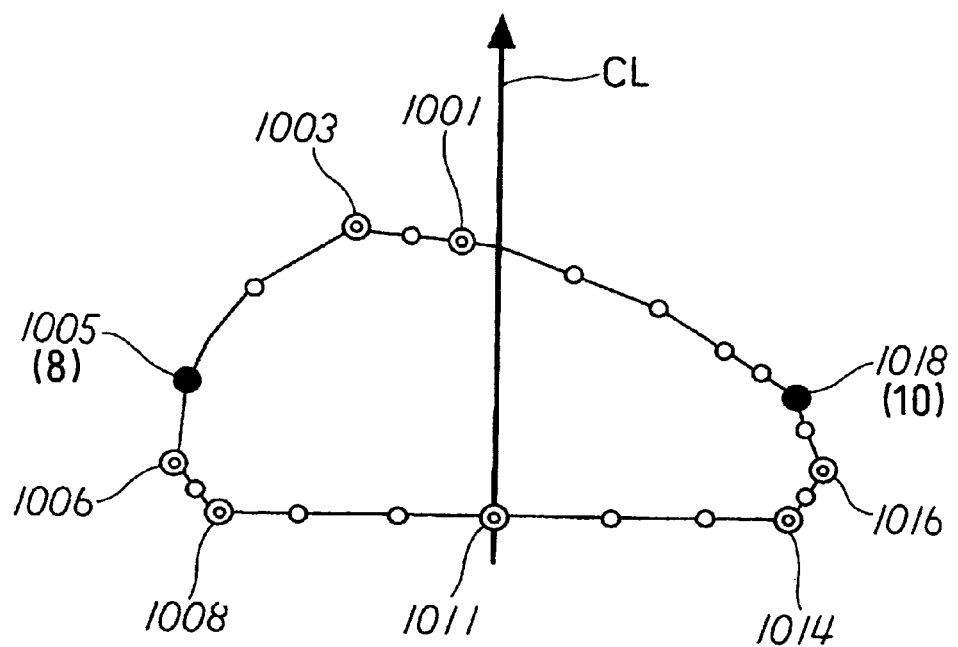
Figure 3K:
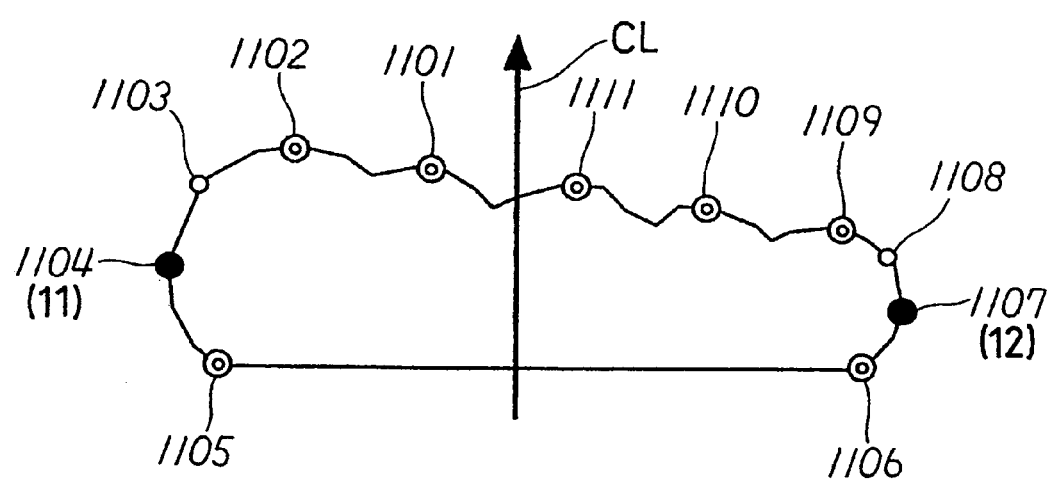
Figure 31:
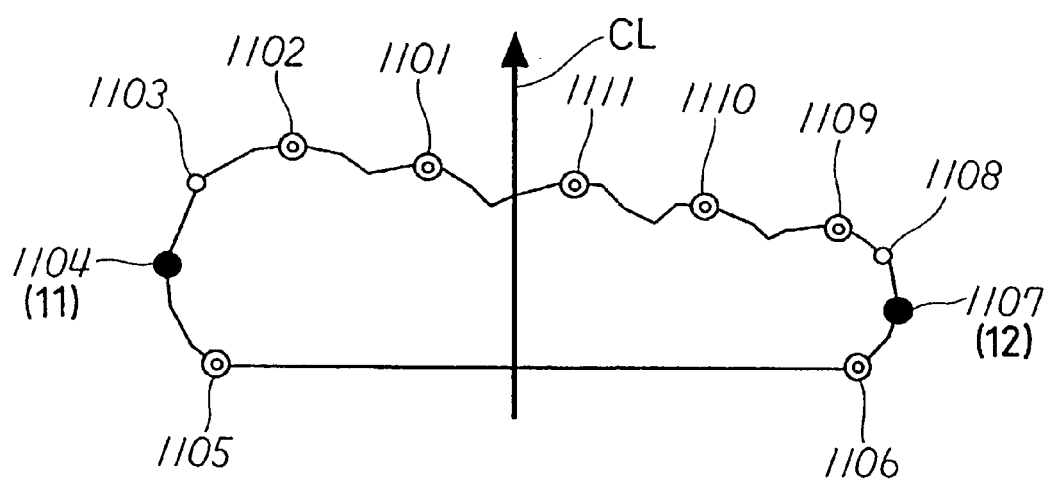

(2) The cross section I data is shown in FIG. 3j.

This cross section data has 23 data points and as the secondary landmarks defined are data point 906 and 916: the most medial/lateral point data point 901: the intersection point with the vertical cross section having foot axis 2 SL data point 903: the intersection point with the line from the anterior tendon point 24 to the posterior tendon point 25 and the cross section I data point 908: the intersection point with the line from the data point 610 of the cross section F to the data point 1108 of the cross section J described below data point 911: the intersection point with the vertical section having foot axis CL data point 914: the intersection point with the outline of the foot contact area of the sole 26

And the dividing landmarks are defined by suitably dividing the surface distance between the secondary landmarks.

Cross Section J (1) The cross section J is a vertical cross section passing through metatarsale tibiale point 8 and metatarsale fibulare point 10.

(2) The following cross section data of the cross section J are shown in FIG. 3j:

Anatomical landmarks are below.

data point 1005: the metatarsale tibiale point 8 data point 1018: the metatarsale fibulare 10

Secondary landmarks are below:

data point 1001: the intersection point with the vertical cross section having foot axis 2 SL data point 1006: the most medially prominent point data point 1016: the most laterally prominent point data point 1003: the intersection point with the line connected between anterior tendon point 24 and posterior tendon point 25 data point 1011: the intersection between vertical section including the foot axis data points 1008 and 1014: the intersections of the cross section J and the outline of the contact area of the sole 26

The dividing points comes from division of the surface distances between anatomical/secondary landmarks made in a suitable manner that are defined as dividing landmarks.

Cross Section K (1) The cross section K is the vertical cross section passing through the contact point of the great toe 11 and the contact point of little toe 12.

(2) The data in the cross section K is shown in FIG. 3l.

In this cross section K, the landmark data 1101~1111 are defined as follows:

Anatomical landmarks:

data point 1104: the contact point of the great toe 11 data point 1107: the contact point of little toe 12

Secondary landmarks:

data points 1102,1101, 1110, 1111, and 1109: the highest points of each toe from great toe~little toe data points 1105 and 1106: the intersection points of the outline of the contact area of the sole 26 data points 1103 and 1108: defined as dividing landmark.

These cross section data includes the outline of the toe to show their forms.

The Foot Axis CL (1) In order to combine the above described cross sections together as FIG. 2a, the establishment of the common coordinate system is indispensable. Such common coordinate system can be established suitably in accordance with the measuring method.

In the case of the embodiment shown here, the line connecting between the pternion 6 and the center of ball point CB that is the midpoint of the widest in the vertical cross section, which passes through the metatarsale tibiale 8 and the metatarsale fibulare 10, is defined as the foot axis CL. The CL is established as standard, and each cross section is arranged on its base. "The foot axis CL" is shown as CL in FIG. 2*b*.

When these data are shown in terms of coordinate points, the projected point of pternion 6 on the foot axis CL is determined as the origin (0,0,0) while the coordinate points of other data are determined on its base. Further the intersection points between vertical cross section that include the foot axis CL, and various cross sections described above are defined as [point (data) on the foot axis CL].

(2) Until recently, the foot shape information has employed the line between the tip of the second toe and the pternion 6 as the standard line. However it is difficult to ascertain the tip of the second toe in some cases depending upon the data of foot measured. Also many ideal foot shape information lack the form of the toes, which made it difficult to determine the standard line as it is based on the tip of the 2nd toe. In the case of the foot axis CL defined in this invention, the standard line can be determined regardless of the existence of the information of the second toe. This is one of the merits of this invention. The last also lacks the shape of toes, which made it difficult to determine the standard line, as in the case of ideal foot shape information. Subsequently this makes it difficult to compare for study foot shape information with last information by way of overlapping.

In the case of the foot axis CL defined in this invention, however, the standard line can be determined regardless of the existence of the data of second toe information. This makes it possible to compare foot shape information with shoes model information by overlapping that is one of the merits of this invention.

Desirable Landmarks

Each cross section data described above consists of related landmarks. Each cross section A~J is composed of 22~28 landmarks, excepting for cross section L that shows toe form. Subsequently the preferable embodiment of this invention is foot shape information that consists of (A)~J cross section, each of which consists of 20~30 data.

The measuring method of the foot shape (1) In order to put this invention into the practical use, the three-dimensional form of the foot has to be measured. For the purpose of measurement, the existing methods can be applied.

For instance the devices listed in NIHONKOKU-SHU-TUGANTOKUKAIHEI (in English, Japan patent application, publication) no. 11-101623 on the title "Shape measuring device and foot shape measuring device" (Reference no. 1), and the one listed in KOKUSAISHUTUGAN (in English, International Patent Application) no. PCT/JP000/02297, KOKUSAI-SHUTUGANBI Jul. 4, 2000 (in English, The date of filing) on the title of "shape measuring device and foot shape measuring device" (Reference no. 2) are both applicable for the purpose. This patent is incorporated by these references.

(2) Although it is possible to secure the three-dimensional data by way of measuring the foot placed on the graph paper with the use of caliper and height gauge, it is preferable to use the above-mentioned measuring devices so that accurate data may be obtained in a short time.

(3) The method described in the reference no. 1 is the way to measure the foot form by projecting light beam on the foot. The method in the reference no. 2 is the way to measure the foot shape with laser beam. The measuring methods in the reference no. 1 and 2 are defined as the electro optical measuring method.

(4) The following methods are available for collecting each cross section data.

i) This method is to use marker on anatomical landmarks (metatarsale tibiale 8 navicular bone point 7 pternion 6 and others) when feet are measured, and the marked positions are to be recognized when the foot data are collected.

For instance, the measuring device shown in reference no. 2 measures with CCD camera the position of the outline of the foot beamed by laser. When markers are put beforehand on the anatomical landmarks that dose not reflect laser beam, the data marked in black fail to reflect the laser beam. This will causes the missing of the points or the holes on the consecutive data line. The position of the data marked can be recognized as a disorder of the data line, which makes it possible to determine the position of the anatomical landmarks. The cross sections stated above can be defined on the base of these anatomical landmarks, and the cross section data can be collected subsequently.

ii) Another method is to measure the data of the entire form of the foot, and determine the anatomical landmarks with the data of the entire form measured. For instance, the data of the form is shown on the display screen, and then the most prominent medial point 1 of medial malleolus is searched on the screen, and it is to be defined as the most prominent medial point 1 of medial malleolus. The most prominent backward point of the heel is to be defined as pternion 6.

Each cross section is sought from the anatomical landmarks defined. The standard point is to be assigned on each cross section, and other points are divided as dividing points. The standard point and these equally divided data is stored as cross section data, because these data determine the form of the foot. All other data are to be deleted because they do not represent any landmarks, although they are themselves parts of the foot form data. By this way the cross section data that is composed only of the data really needed can be secured.

iii) This is the method to put marks beforehand on the position of the anatomical landmarks, the secondary landmarks, and the dividing landmarks. The landmarks are confirmed by hand-touch manually on the foot bone position, and the position is marked. Then three-dimensional digitizer tool is applied. The foot shape data of each position are stored by the method to press pen point of the tool on the above-mentioned marks in its actual performance.

The cross section data measured with these methods are composed only of the required data. Subsequently they can describe the three-dimensional foot shape model effectively with limited data volume.

iv) This method is to mark with aqueous pen on the points of anatomical landmarks, secondary landmarks, and dividing landmarks of the foot surface as in the case of iii). The foot to be measured is to be placed into the vessel that is filled with molding materials, to be kept there for some time until the materials become solidified. After the materials become solidified, the foot is to be withdrawn from the vessel. Then the hollow of the foot shape is to be filled with gypsum. The marks originally written with aqueous pen on the surface of the foot are to be trans-printed first to the molding materials and then onto the gypsum from the molding materials. In this way the aqueous pen marks can be printed finally on the surface of the foot shape gypsum. With these marks the cross section data and its landmarks that consist of the cross section can be determined.

The Structure of "Foot Shape Information"

(1) "Foot shape information" of this invention includes the cross section data of the above-mentioned cross sections from (A) to (K). The number of the cross section to be selected and the mode of the cross section combination can be decided adequately in accordance with the purpose of the application.

(2) One of the examples of foot shape information structure is the one that includes all cross sections from (A) to (K). With this information the entire measured foot shape can be defined precisely. Further if all cross sections are composed of the above-mentioned landmarks only, then the total foot shape can be described most effectively with limited volume of data (3) It is not always necessary to have all cross section data in foot shape information. The foot shape information can be the combination of some of the selected cross section data. The cross section data is useful for describing the three dimensional form of the foot at the place where the cross section stands. But when it is intended to evaluate the form information of the foot, or intended to manufacture shoes from foot shape information, one cross section data is not enough. It is desirable for foot shape information to include more than 4 cross sections for such purpose.

(4) There is no rigid rule in composing the combination of the required 5 cross sections. The following combination of the cross sections can be available.
  i) In the case of study of the ankle form and the form of malleoli, cross section A~E can be selected, or cross section B~F can be selected, or cross sections of A, C~F can be selected too. Accordingly foot shape information can be composed of the suitable cross sections being freely selected in accordance with the purpose.
  ii) In the case of study of the toe part, the cross sections that include G~K, or the combination of the cross sections, F, G, I, J and K are workable.
  iii) When the foot is disjoined in 5 parts, namely, ankle, malleolus, arch, ball, and toe, it is possible to determine three-dimensional model of the entire foot effectively with limited amount of data by way of including one cross section in each of 5 parts mentioned above.
    The cross sections that correspond to each part of the foot are as follows;
      Ankle part Cross section A and B
      Malleoli part Cross section C, D, E, and F
      Arch part Cross section G and H
      Ball part Cross section I and J
      Toe part Cross section K (5) It is preferable to include the surface data of the foot shape in "foot shape information" in addition to the cross section data as described above.

Further it is desirable for the form surface data, not to deviate beyond 1.0 mm from the data of the actual foot shape measured.

2. Storage Media of "Foot Shape Information"

One of the embodiments of this invention is the storage media that is electronically readable by computer. The usage of the "foot shape information" will be prompted with these storage media. The device for storage can be of any kinds, in so far as they can store large amount of data in a stable manner. There is no specific limitation in its system and structure. The storage media in the actual structure can be hard disks in the computer, CD (compact disk), the data of which is electronically readable, DVD, and others. However in view of the easiness of the procedure of the data input and output job as well as its capability to meet the requirement to handle very large amount of data, hard disk is the most suitable device for the purpose. Further the memory IC in the computer that store data is also workable as storage device in the structure. The memory card, which is convenient for carriage is also another workable storage media.

Furthermore the storage media is not necessary to be the one, which transacts independently, such as CD. In other word it can be the storage media integrated in the computer itself. Also the storage media is not necessarily to be included in the server machine. It can be placed outside of the server machine, in so far as it can electronically exchange data in both ways with server machine through the electronic communication means such as dedicated line. The existence of the storage media related with this invention can be ascertained by way of reading foot shape information appeared on the display screen.

3. Network System and Server Machine (1) There are many ways of embodiments of our above-mentioned "foot shape information". For instances, it can be embodied in manufacturing shoes or in selecting the shoes that fit to a particular customer based on foot shape information. In this case, if this information can be transferred through network, the information can be used without any loss of time in the very wide area, which enhances the value of the information itself in the actual usage.

This invention is a network system that is composed of user terminals 41 and server machine 42, which transfer electronically through network 43 "foot shape information" that include cross section data shown in (A)~(K) as mentioned to user terminals. It is preferable for its embodiment to include more than 4 cross sections in its foot shape information for determining the entire foot form.

Figure 4:
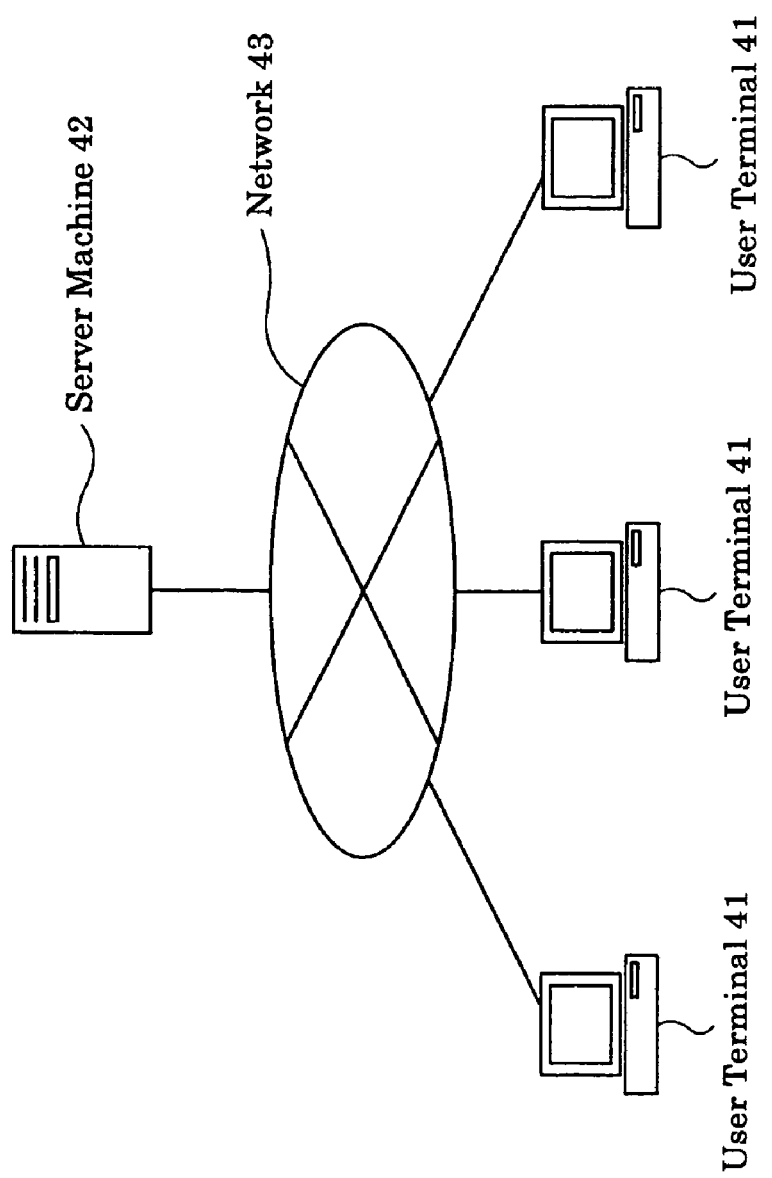
FIG. 4: Drawing to show the entire structure of the network system

(2) The structure of entire system is shown in FIG. 4. The server machine 42 that distributes electronically foot shape information, and the user terminals 41 that receive such information are connected together through network 43. The network 43 can be any medium in so far as it can transfer electronically data from server 42 to user terminal 41, such as telephone line, LAN, WAN and others. In view of the readiness of the availability of the equipment and the nature of the usage appliance for wide area, Internet is quite preferable to be used as network 43. The network 43 also can be wireless style, and not necessarily to be on wire.

Figure 5:
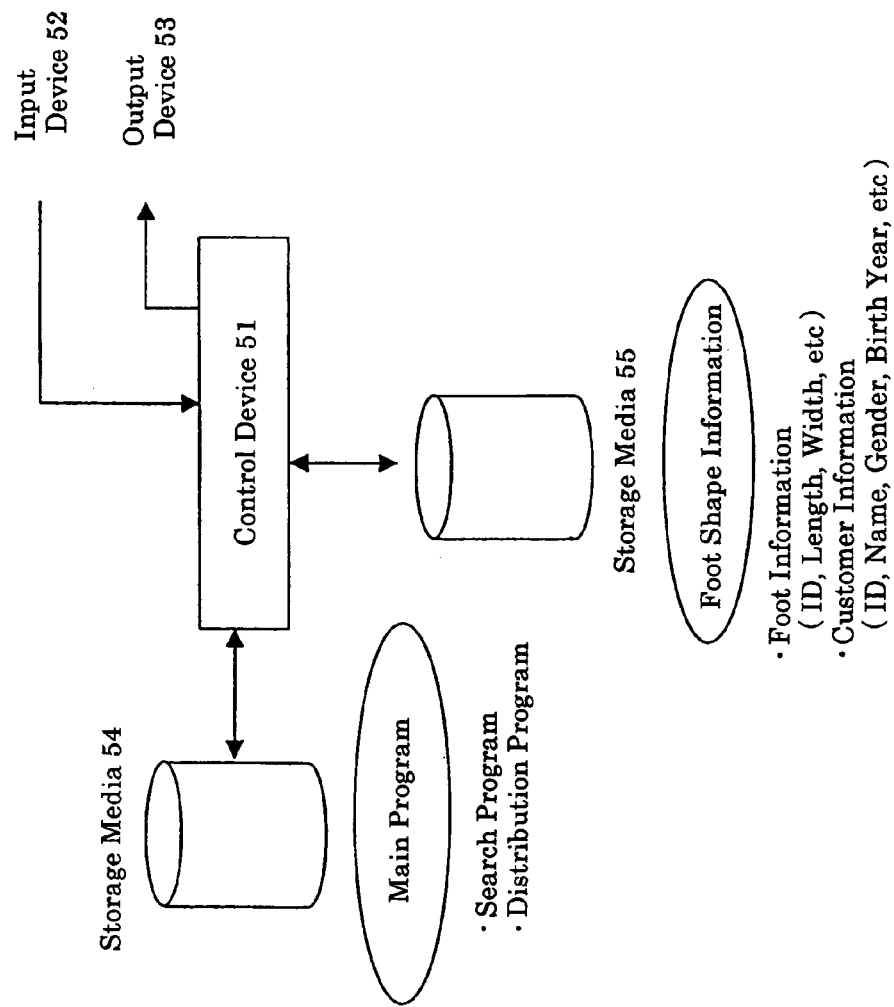
FIG. 5: Block diagram to show the structure of the server machine

(3) The structure of the Server Machine
  i) FIG. 5 is a block diagram showing the structure of server machine 42. The mark 51 represents the control device that consists of CPU, memory and others. It assumes control of each function, distribution of data, various calculation, short time storage of the data and others. Mark 52 is an input device that controls input data receiving from user terminals through network 43. Mark 53 is an output device that sends foot shape information to user terminals. In the case of transferring data through Internet, this server machine will also act as data base server. Mark 54 and 55 are the storage media of various types that store the following programs and data.

ii) Storage 54 stores the main program to retrieve foot shape information from storage 55, and the program to send the information to the user terminals, and others.

iii) Storage 55 stores foot shape information. The foot shape information being stored here is not necessarily required to include the same cross section data in common. Each piece of foot shape information may include its own cross section data. In the embodiment to be described hereafter, each piece of foot shape information can include its own foot size, foot width, gender, age, customer information, and others that correspond to it.

Further it is desirable to include more than 2 numbers of "foot shape information data" against one foot-size to meet the wide variety of requirement coming from users.

(4) User Terminal i) "User terminal 41" is the terminal being useful for user to secure necessary information as described above. It can be a computer that consists of display, control device, input/output device (key board and mouse, etc), and communication device. This computer may be either desktop or mobile type. User terminal 41 receives foot shape information through network 43. It may be the way to send request from terminal for specific foot shape information to server machine or it may be the way to receive the information from server, which is selected by server machine 42.

ii) In the case of embodiment that foot shape information is analyzed by FFD technique, user terminal includes FFD analysis method. The FFD analysis method is an analysis program, such as listed in NIHONKOKU TOKKAIHEI (in English, Japan patent publication) H10-240964 on the title of "the Average form generating method of plurality of three dimensional forms and its device" (reference 3).

Further user terminal storage 41 stores foot shape information that includes cross section (A)~(K) as described above, each of which contains landmarks from 10 to 100.

iii) The foot shape information that is stored in the user terminal is not necessarily to be kept there for long time. Some of foot shape information measured in the place are stored there for temporary purpose. Further it is preferable for foot shape information stored in the terminal to include more than 4 cross sections, so that it may analyze effectively the entire foot form.

Distribution System of Foot Shape Information

The embodiment of this invention related to network system and server machine 42 that distributes electronically foot shape information is explained hereafter. Those who intend to obtain foot shape information are to access from terminal to server machine through network 43. It can be the system that server machine asks the applicant for pass word or ID number so that it may allow the access only from the authorized applicant.

(1) EMBODIMENT 1

This is an embodiment related to the network system and the server machine 42 that distributes only one kind of foot shape information. For instance, the distribution of foot shape information of a certain famed athlete enables various shoes maker to manufacture the model shoes of the athlete utilizing the information they received. In the actual procedure, a request to seek a certain kind of foot shape information will be sent from user terminal 41 to server machine 42. Upon receipt of it, the server machine retrieves searching program with control 51, and makes query into the database of storage 55 to get transferred the necessary foot shape information from it.

Then it transfers the information to the terminal through output 53 under control 51.

(2) EMBODIMENT 2

This is the embodiment related to storage 55 that stores plural number of "foot shape information", and distributes the selected information to users in accordance with their requirement. For instance, in this embodiment, the data of foot size, foot width, gender, age, etc. together with their corresponding foot shape information are stored in storage 55 that, upon receipt of such request from user as "require foot shape information for male with 27 cm foot size" retrieve the corresponding foot shape information to send it to user.

The structure of this embodiment is that while storage 55 stores the data of "foot size", "gender", "age", "foot width", etc. corresponding to foot-shape information respectively, storage 54 stores the retrieving and distributing program so that it may retrieve and transfer an appropriate "foot-shape information" to the terminal upon receipt of request from user.

In this embodiment it is desirable for server machine to store two numbers of information based on male and female, besides foot shape information that corresponds to each foot size.

Another applicable embodiment of this invention is that storage 55 stores "age", "foot width" and others besides "foot size" and "gender" corresponding to "foot shape information", and furthermore it stores more than 2 numbers of "foot shape information data" against each of "gender", "age", and "foot width".

(3) EMBODIMENT 3

Another embodiment is that storage 55 stores customer information (name, ID number and others that identify customer) that corresponds to customer's (user's) foot shape information.

"Customer" meant here is the person who entrusts others to select fit shoes to him/her or order customized shoes to be made based on his/her own foot shape information.

In this embodiment, customer requests server machine 42 to transfer his/her foot shape information to user terminal. Server machine 42 retrieves necessary foot shape information from storage 55 based on the customer information, and sends the retrieved information to user terminal 41. This embodiment offers such merits to customer, as he/she can make order of customized shoes without measuring his/her foot shape each time to make order, once his/her foot shape information were stored in server machine.

4. System for FFD Analysis

Another embodiment of this invention related to network system is to provide environment where foot shape information can be analyzed with FFD technique.

(1) User terminal stores FFD analyzing program and "foot shape information" including some of (A)~(K) "cross section data" having landmarks from 5 to 200 in its storage device. FFD analysis program is the computer program something like the one listed in the above-mentioned reference 3.

(2) The foot shape information being transferred from server 42 to user terminal 41 includes the cross section data that locate at the same position as that of the cross section included in foot shape information stored in user terminal 41, and that consist of landmarks of the same definition. The distribution system of foot shape information referred here has the same structure as server machine 42 has as mentioned above.

As such, in this embodiment, both of foot shape information that is transferred from server machine 42 to user terminal 41 and foot shape information pre-stored in user terminal 41 include the cross section data of the same cross section. Further both of these cross sections consist of the same kind of landmarks.

Since these two pieces of foot shape information have corresponding landmarks each other, user terminal 41, while containing foot shape information received from server machine and the one pre-stored, can link these corresponding landmarks, so that it may provide environment where FFD analysis work can be carried out effectively.

As explained earlier, it is desirable for landmarks to consist of anatomical landmarks, secondary landmarks, and dividing landmarks. Further it is also desirable for each of foot shape information to be compared to contain more than 4 cross section data respectively, if FFD technique is applied for the comparison.

5. Shoes Selection System (1) This invention can be embodied without the use of network media as shown here. This embodiment is a shoes selection system useful for a customer and a selector. "Customer" here means one who has his/her feet measured and entrusts a selector to choose the fittest shoes to his/her feet. "Selector" here means one who compares foot shape information of the customer with the information of shoes cross section to choose the fittest shoes to the customer. He is called as "shoe fitter" in Japan.

(2) The main part of this system is the computer that stores "ideal foot shape information".

(3) The electro optical measuring equipment meant in this invention includes all kinds of foot scanning system with electro optical method as mentioned in the column of "★ Measuring method of the foot shape" The units described in "reference 1" and "reference 2" are some of the examples for it.

The major cause that pushes us to employ exclusively the electro optical method as our standard measuring equipments is our concern about the speed of measurement process. This invention of the shoes selection system is aimed to provide facility to customers to select the fittest shoes to them who visit retail store. Accordingly speedy measurement is one of the key issues of this invention. The electro optical method enables us to measure feet in a speedy and uninterrupted manner. This is the reason why the measuring equipment of electro optical method are employed exclusively for better embodiment of this invention.

(4) The above-mentioned computer is a suitable equipment to embody various methods into practice, such as, the method to develop "foot shape information" that contain some of cross sections out of cross section (A)~(K) based on the measurement of foot shape, the method to compare individual "foot-shape information" with "ideal foot shape information" of shoes, and the method to select fit shoes to customer as a result of the comparison. The structure of the computer is shown in FIG. 6.

The computer is composed of control device 61, input device 62, output device 63, storage media 64 and 65, and display screen 66. The data measured are transferred from electro optical foot scanner 67 to the computer. Computer and electro optical measurement unit can be physically independent that works together in combination. However it is not necessarily to be physically independent. One integrated computer may perform both functions in some cases. Storage 64 stores the program to compose foot shape information, the program to retrieve ideal foot shape information, the program to compare foot shape information with ideal foot shape information, and program to select fit shoes to customer.

The program for developing foot shape information help us to create the cross section data at appropriate positions in the cross sections (A)~(K) that are included in the three-dimensional foot shape data being sent from electro optical measurement unit. In addition, if it is intended to use comparison program mentioned hereafter to help FFD analysis work, the landmarks of the same definition as that of these landmarks of the ideal foot shape information in the cross section data created are to be included.

Storage 65 stores various types of shoes information and ideal foot shape information corresponding to each shoe.

In case foot size is the checking mark for comparison, foot sizes that correspond to ideal foot shape information are to be stored. In case foot width is the checking mark for comparison, foot widths that correspond to ideal foot shape information are to be stored. It is desirable to store customer foot shape information (three dimensional foot form data and cross section data) in storage 65 for the convenience of customer who might use it at later time.

(5) The flow of optimal shoe selection

The followings are the whole flow of optimal shoe selection.

i) Foot shape information is to be transferred from the above-mentioned measuring unit to control 65 through input 62 and to be stored there for short time, and foot size information is also transferred and stored there simultaneously.

ii) Control 61 makes query into storage 65 to retrieve ideal shoes information of the required size based on the foot size set as check mark.

iii) Control 61 uses comparison program to compare foot shape information with ideal foot shape information of shoes. The procedure of comparison will be explained later.

iv) Once the first comparison is over, control 61 makes another query into storage 65 to retrieve other ideal foot shape information of shoes to compare them one after another.

v) After several comparisons are made, control 61 completes the selection of the ideal foot shape information of the fittest shoes with the help of selection program, and makes final selection of the optimal shoes to customer based on the information.

vi) The information of the shoes thus chosen is to be displayed on display 66 through output 63.

(6) The case to compare foot shape information with shoes shape information to choose fit shoes to customer;

i) This is the way that customer or selector selects shoes by viewing in the display screen the overlapping the form of foot shape information (shown in FIGS. 2a~2e, FIGS. 3a~3k) over ideal foot shape information of shoes.

ii) Or shoes selection can be made objectively by observing the quantified deviation of the data between foot shape information and information of shoes form.

The another way to select shoes by quantification, is to measure the distance between a certain point in foot shape information and its corresponding point in ideal foot shape information, and make a choice of the shoes that has the shortest distance of the deviation measured, or to select the shoes, the distance deviation of which remains within a certain figure specified beforehand (the method to secure a certain space) and others For quantification, FFD analysis method also can be applied as mentioned above.

(7) Selection of shoes with FFD analysis method

Further this invention can be embodied in the following ways to analyze foot shape information containing cross section data at certain position chosen out of cross section (A)~(K) mentioned above with FFD technique.

i) Structure of computer is the same as shown in FIG. 6

In this embodiment, storage 64 stores FFD analysis program, and storage 65 stores plural ideal foot shape information and some of categorized last information against each piece of ideal foot shape information.

"Categorized last information" is the categorized lasts for various uses that is developed out of ideal foot shape information. In practice each shoemaker, while keeping his own ideal foot shape information, manufactures shoes for soccer, for pumps, for jogging, and for others based on the ideal foot shape information they have. Accordingly the last made for various usages that is derived out of one piece of ideal foot shape information is called as "categorized last information".

In this embodiment all of these categorized last information, ideal foot shape information and foot shape information of customer are to include the same cross section data and the same data structure that contain the same landmarks so that FFD technique can be applied. Each shoemaker input categorized last information of his own based on the different ideal foot shape information.

Accordingly in this embodiment it is preferable for each shoemaker to keep ideal foot shape information (preferably more than 2 makers) and categorized last information (preferably more than 4 against one piece of ideal foot shape information) in his storage.

ii) The following process is the way that customer selects pumps.

Customer's foot shape information is measured with electro optical foot scanner 67, and then transferred to control 61.

When customer selects pumps, control 61 retrieves a piece of ideal foot shape information and categorized last information of pumps that is corresponding to the information.

(In this explanation the comparison is made with ideal foot shape being kept by A store)

Control 61 runs FDD analysis work, compares each landmarks included in ideal foot shape information as well as in categorized last information for pumps, and seeks the condition (conversion condition) to convert ideal foot shape information into categorized last information for pumps.

With this conversion condition, customer's foot shape information is converted into foot shape information for pumps. The foot shape information after conversion is considered as the optimal foot shape information.

Then the fittest pump can be selected by comparison of customer's optimal foot shape information being converted for pumps with the last for pumps being kept by A store.

In this way customer can select the fittest shoes by comparing the optimal foot shape information converted into categorical information with the existing last for pumps.

Customer can carry out the similar process with ideal foot shape information kept by B store C store that enable customer to select the fittest last out of existing pumps kept by various stores.

iii) Further shoemaker can engrave a last referring directly to the customer's most optimized foot shape information, and manufactures a last customized for each customer accordingly. Numerical control machine tools and others can be used for engraving last too.

The Potentiality to Contribute Towards Shoes Industry

This invention offers the means to determine foot shape effectively with limited amount of information by way of defining the measuring point of foot shape based on anatomical landmarks. Subsequently communication load is reduced, and interactive communication traffics carrying foot shape data can be extensively encouraged, which turns to offer the potentiality to contribute towards overall shoes industry.

MARKS

A~K Cross section A~Cross section K
* Cross section B includes Cross section Ba and Cross section Bb Cross section C includes Cross section Ca, Cross section Cb
1. The most prominent point of medial malleolus
2. Sphyrion
3. The most prominent point of lateral malleolus
4. Sphyrion fibulare
5. Junction point
6. Pternion (Heel point)
7. Navicular bone point
8. Metatarsale tibiale
9. $5^{th}$ metatarsale tuberosity point
10. Metatarsale fibulare
11. Contact point of the great toe
12. Contact point of the $5^{th}$ toe
15. $2^{nd}$ metatarsale head
23. Heel contact point
24. Anterior tendon point
25. Posterior tendon point
26. the outline of the contact area of the sole
27. Foot axis junction point
41 User terminal
42. Server machine
43. Network
67. Electro optical measurement equipment of foot-shape
HT1. Sphyrion height
HT2. Sphyrion fibulare height HT3 Medial malleolus height
HT.4 Lateral malleolus height
HT5. Height of cross section A
CL The foot axis
CB Center of ball point
SL Foot axis 2
BL Posterior tendon parallel line
A1 Anterior point of cross section A
A2 Posterior point of cross section A
B1. The point on the ankle surface just above the most prominent point 1 of medial malleolus at the average height of the height (HT5) of the cross section A
B2 The dividing point near the anterior point A1 of the cross section A out of the 2 dividing points of the surface distance between the anterior point A1 of the cross section A and the junction point 5 into 3 equal length parts
B3 The point on the ankle surface just above the most prominent point 3 of lateral malleolus at the average height of the height (HT5) of the cross section A and the height (HT4) of the most prominent point 3 of lateral malleolus
B4 The dividing point near the posterior point A2 of the cross section A out of the 2 dividing points of the surface distance between the posterior point A2 of the cross section A and the pternion 6 into 3 equal length parts
C1. The dividing point near the junction point 5 out of the 2 dividing points of the surface distance between the anterior point A1 of the cross section A and the junction point 5
C2 The dividing point near the pternion 6 out of the 2 dividing points of the surface distance between the posterior point A2 of the cross section A and the pternion 6 into 3 equal length parts
E1 The dividing point nearest to the junction points 5 among the 3 dividing points of the surface distance between the tendon point H3 of this cross section H and the junction point 5 into 4 equal length parts
F1 The midpoint between the tendon point (H3) of the cross section H and the junction point 5
F2 The medial intersection point (F2) of the line passing through the foot axis junction point 27 and perpendicular to the foot axis CL and the outline of the foot contact area of sole 26.
F3 The lateral intersection point (F3) of the line passing through the foot axis junction point 27 and perpendicular to the foot axis CL and the outline of the foot contact area of sole 26
G1 The dividing point near the tendon point (H3) of the cross section H in the 3 dividing points of the surface distance between the tendon point (H3) of the cross section H and junction point 5 into four equal length parts
H1 The point near the navicular bone point 7 in the 2 dividing points of the surface distance between the metatarsale tibiale 8 and the navicular bone point 7 into 3 equal length parts
H2 The point near $5^{th}$ metatarsal tuberosity point 9 in the 3 dividing points of the surface distance between metatarsale fibulare 10 and $5^{th}$ metatarsal tuberosity point 9 into 4 equal length parts
H3 The intersection point between the line passing through anterior tendon point 24 and posterior tendon point 25 and the cross section H (tendon point (H3) on the cross section H)
I1. The point near the metatarsale tibiale 8 in the 2 dividing points of the surface distance between the metatarsale tibiale 8 and the navicular bone point 7 into three equal length parts
I2 The point near the metatarsale fibulare 10 in the 2 dividing points of the surface distance between the metatarsale fibulare 10 and $5^{th}$ metatarsale tuberosity point 9 into 3 equal length parts

What is claimed is:

1. A network system including a network (43), a plurality of user terminals (41) coupled to said network (43) and a server machine (42) using cross section data defining three dimensional foot forms based upon anatomical landmarks on a human foot coupled to said network, wherein the server machine (42) comprises:
  a computer readable storage medium having stored therein said cross section data defining three dimensional foot forms based on said anatomical landmarks of a human foot comprising:
    (A): A horizontal cross section taken at a position 1.6 times as long as a mean height between a sphyrion height (HT1) and a sphyrion fibulare height (HT2);
    (Ba): A cross section passing through the following three points:
      a point (B1) on an ankle surface vertically adjacent a most prominent medial malleolus point (1) at an average height (HT5) of the cross section (A) and a height (HT3) of the most prominent medial malleolus point (1),
      a point (B2) closer to an anterior point (A1) of the cross section (A) out of two points dividing a surface distance between the anterior point (A1) of the cross section (A) and a junction point (5) into three equal length parts, and
      a point (B3) on the ankle surface vertically adjacent a most prominent lateral malleolus point (3) at an average height (HT5) of the cross section (A) and a height (HT4) of the most prominent lateral malleolus point (3);
    (Bb): A cross section passing through the following three points:
      the point (B1) on the ankle surface just above the most prominent medial malleolus point (1) at the average height (HT5) of a cross section (A) and the height (HT3) of the most prominent medial malleolus point (1),
      a point (B4) closer to a posterior point (A2) of the cross section (A) out of two points dividing a surface distance between the posterior point (A2) of the cross section (A) and a pternion point (6) into three equal length parts, and
      the point (B3) on the ankle surface vertically adjacent the most prominent lateral malleolus point (3) at the average height (HT5) of the cross section (A) and the height (HT4) of the most prominent lateral malleolus point (3);
    (Ca): A cross section passing through the following three points:
      the most prominent medial malleolus point (1),
      the most prominent lateral alveolus point (3), and
      a point (C1) closer to the junction point (5) out of the two points dividing the surface distance between the anterior point (A1) of the cross section (A) and the junction point (5) into three equal length parts;
    (Cb): A cross section passing the following three points:
      the most prominent medial alveolus point (1),
      the most prominent lateral alveolus point (3), and
      a point (C2) closer to the pternion point (6) out of the two points of the surface distance between the posterior point (A2) of the cross section (A) and the pternion point (6) into three equal length parts;

(D): A cross section passing through a sphyrion point (2), a sphyrion fibulare point (4) and the pternion point (6);

(E): A cross section vertical to a sagittal plane including a foot axis (CL) and passing through the following two points:
  a point (E1) closest to the junction point (5) out of three points dividing a surface distance between the junction point (5) and a tendon point (H3) of a cross section (H) into four equal length parts, wherein the tendon point (H3) is an intersection point of a line connecting an anterior tendon point (24) and a posterior tendon point (25) and the cross section (H), and
  a heel contact point (23);

(F): A cross section passing through the following three points:
  a midpoint (F1) between the tendon point (H3) of the cross section (H) and the junction point (5),
  an inside intersection point (F2) of a vertical line to the foot axis (CL) passing through a foot axis junction point (27) and a sole-outline (26), and
  an outside intersection point (F3) of the vertical line to the foot axis (CL) passing through the foot axis junction point (27) and the sole-outline (26);

(G): A cross section vertical to the sagittal plane including the foot axis (CL) and passing through the following two points:
  a $5^{th}$ metatarsal tuberosity point (9), and
  a point (G1) closest to the tendon point (H3) of the cross section (H) out of three points dividing the surface distance between the tendon point (H3) of the cross section (H) and the junction point (5) into four equal length parts;

(H): A vertical cross section passing through the following two points:
  a point (H1) closer to a navicular bone point (7) out of two points dividing a surface distance between the navicular bone point (7) and a metatarsal tibiale point (8) into three equal length parts, and
  a point (H2) closer to the $5^{th}$ metatarsal tuberosity point (9) of two points dividing a surface distance between a metatarsal fibulare point (10) and the $5^{th}$ metatarsal tuberosity point (9) into three equal length parts;

(I): A vertical cross section passing through the following two points:
  a point (I1) closer to the metatarsal tibiale point (8) of the two points dividing the surface distance between the navicular bone point (7) and the metatarsal tibiale point (8) into three equal length parts, and
  a point (I2) closer to the metatarsal fibulare point (10) of two points dividing the surface distance between the metatarsal fibulare point (10) and the $5^{th}$ metatarsal tuberosity point (9) into three equal length parts;

(J): A vertical cross section passing through the metatarsal tibiale point (8) and the metatarsal fibulare point (10);

(K): A vertical cross section passing through a contact point (11) of great toe and a contact point (12) of the little toe;

a means for distributing foot shape information containing at least more than four of said cross section data of (A) through (K) to any one of said plurality of user terminals (41);

means for storing ideal foot shape information;

means for comparing the distributed foot shape information with the stored ideal foot shape information; and means for selecting or manufacturing shoes for a customer based upon the comparison.

* * * * *